(12) United States Patent
Yanagisawa

(10) Patent No.: US 8,876,302 B2
(45) Date of Patent: Nov. 4, 2014

(54) PROJECTOR

(75) Inventor: Hirotaka Yanagisawa, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 817 days.

(21) Appl. No.: 12/544,275

(22) Filed: Aug. 20, 2009

(65) Prior Publication Data

US 2010/0053558 A1    Mar. 4, 2010

(30) Foreign Application Priority Data

Sep. 1, 2008  (JP) ................................. 2008-223134
Jun. 12, 2009 (JP) ................................. 2009-140900

(51) Int. Cl.
*G03B 21/14*    (2006.01)

(52) U.S. Cl.
CPC ....................................... *G03B 21/14* (2013.01)
USPC ........................................................... 353/84

(58) Field of Classification Search
USPC ...................................... 353/30, 84; 359/889
See application file for complete search history.

(56) References Cited

U.S. PATENT DOCUMENTS

| | | | |
|---|---|---|---|
| 6,379,010 B1 | 4/2002 | Suzuki et al. | |
| 6,876,505 B2 * | 4/2005 | Niwa | ............................ 359/891 |
| 6,919,992 B2 | 7/2005 | Koyama | |
| 7,158,308 B2 | 1/2007 | Koyama | |
| 2004/0165156 A1 * | 8/2004 | Akiyama | ......................... 353/84 |
| 2004/0196442 A1 * | 10/2004 | D'Alessio et al. | .............. 353/85 |
| 2006/0209271 A1 * | 9/2006 | Clark et al. | .................... 353/119 |
| 2006/0256290 A1 * | 11/2006 | Imahase et al. | ................. 353/20 |
| 2006/0268232 A1 * | 11/2006 | Jin | ................ 352/204 |
| 2007/0103563 A1 * | 5/2007 | McDonald | ................. 348/223.1 |
| 2007/0274029 A1 * | 11/2007 | Lee et al. | ....................... 361/679 |
| 2007/0296875 A1 * | 12/2007 | Allen et al. | ..................... 348/743 |
| 2009/0051884 A1 * | 2/2009 | Kuan et al. | ...................... 353/84 |

FOREIGN PATENT DOCUMENTS

| | | |
|---|---|---|
| JP | 08-043764 A | 2/1996 |
| JP | 2001-13585 A | 1/2001 |
| JP | 2003-107220 A | 4/2003 |
| JP | 2004-062136 A | 2/2004 |
| JP | 2004-094175 A | 3/2004 |
| JP | 2004-94175 A | 3/2004 |
| JP | 2005-115202 A | 4/2005 |
| JP | 2006-145845 A | 6/2006 |
| JP | 2006-145863 A | 6/2006 |
| JP | 2007-304607 A | 11/2007 |

* cited by examiner

*Primary Examiner* — Thanh Luu
*Assistant Examiner* — Danell L Owens
(74) *Attorney, Agent, or Firm* — ALG Intellectual Property, LLC

(57) ABSTRACT

A projector includes: a light modulation unit that modulates illumination light; a projection unit that projects image light modulated by the light modulation unit; and a holder that holds an optical filter and a cover in such a way that the optical filter and the cover can be alternately switched and positioned in an optical path on the light-exiting side of the projection unit.

17 Claims, 17 Drawing Sheets

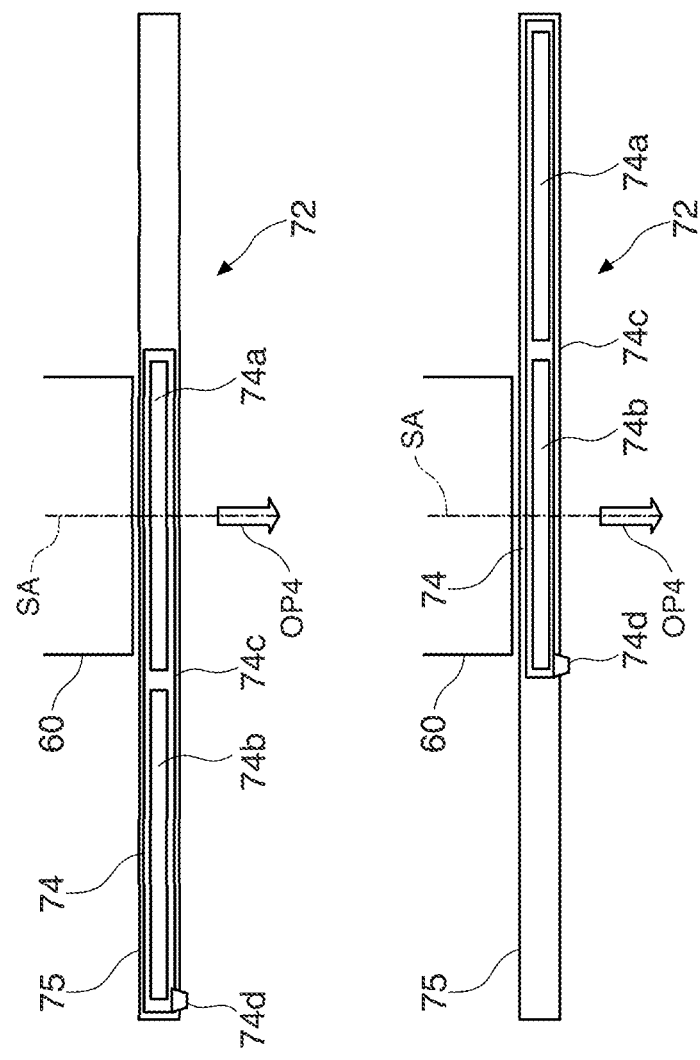

PROJECTOR

BACKGROUND

1. Technical Field

The present invention relates to a projector that projects an image formed by a light modulation unit on a screen.

2. Related Art

There is a projector of related art that has an optical filter for attenuating green light detachably disposed downstream of a projection lens and optically switches the display mode between a bright mode and a color-priority mode while maintaining the contrast of a projected image (see JP-A-2004-94175).

There is another projector of related art including a mechanism that inserts and retracts an optical filter for improving color reproducibility to and from the optical path upstream of a transmissive liquid crystal panel for a particular color (see JP-A-2001-13585). JP-A-2001-13585 describes white balance adjustment in a high-brightness mode in which a high priority is given to the brightness.

There is another known projector that addresses a problem of possible unevenness in brightness and color due to the angle of incidence of linearly polarized light projected on a screen when the projection light from the projector is formed of red, blue, and green light whose polarization directions differ from one another. To reduce the unevenness, a quarter-wave plate is disposed on the light-exiting side of a dichroic prism that combines the red, blue, and green light to convert the combined light into circularly polarized light (see JP-A-2007-304607).

The projector described in JP-A-2004-94175, however, has a structure in which the optical filter is placed in front of the projection lens. The structure is sometimes problematic in storing the optical filter and protecting the projection lens when the optical filter is not in use.

In the projector described in JP-A-2001-13585, since the optical filter is disposed upstream of the liquid crystal panel, it is necessary to provide a space around the liquid crystal panel for accommodating the mechanism for inserting and retracting the optical filter. As a result, the optical system needs to be arranged under constraints, or the projector tends to increase in size.

In the projector described in JP-A-2007-304607, since the quarter-wave plate as an optical filter is inserted between liquid crystal panels and a projection lens, where the optical density is relatively high, the quarter-wave plate needs to be made of an expensive material so that its reliability is maintained, and the back-focal length of the projection lens needs to be increased. As a result, the constraint on the layout of the optical system may increase and the cost may increase accordingly.

SUMMARY

An advantage of some aspects of the invention is to provide a projector in which an optical filter insertable and retractable to and from the optical path is incorporated in a small space while the degree of freedom in designing the layout of the optical system is maintained.

A projector according to an aspect of the invention includes a light modulation unit that modulates illumination light, a projection unit that projects image light modulated by the light modulation unit, and a holder that holds an optical filter and a cover in such a way that the optical filter and the cover can be alternately switched and positioned in an optical path on the light-exiting side of the projection unit. The optical filter used herein means, for example, a color filter that adjusts the wavelength distribution of the light passing therethrough, a quarter-wave plate and a polarizer, each of which is a polarization adjuster that adjusts the polarization state of the light passing therethrough, and a light attenuating filter that adjusts the total amount of light by reducing it.

According to the projector described above, since the holder holds the optical filter and the cover in such a way that the optical filter and the cover can be alternately switched and positioned in the optical path on the light-exiting side of the projection unit, projection according to the characteristics of the optical filter can be carried out when the optical filter is positioned in the optical path, whereas the projection unit can be protected from damage and dusts when the cover is positioned in the optical path. In this configuration, since the holder allows the optical filter and the cover to be alternately switched and positioned in the optical path on the light-exiting side of the projection unit, the color filter and the cover along with the holder can be incorporated in a small space in the projector, which eliminates the need to change the basic configuration of an optical engine in the projector.

It is preferred in the projector that the optical filter is a color filter that adjusts the wavelength distribution of the light passing therethrough. In this case, projection can be carried out, for example, in a color tone-priority mode in which a high priority is given to color reproducibility by positioning the color filter as the optical filter in the optical path.

It is preferred that a dielectric multilayer film having a non-uniform transmittance-wavelength characteristic is formed on the light exiting-side surface of the color filter, and an anti-reflection film is formed on the light incident-side surface of the color filter. In this case, the color filter can precisely attenuate light having a specific color, and can reduce reflection from the color filter itself not to cause degradation in image quality.

It is preferred that the optical filter is a polarization adjuster that adjusts the polarization state of the light passing therethrough. In this case, the polarization state of the projection light can be adjusted by positioning the polarization adjuster as the optical filter in the optical path.

It is preferred that the polarization adjuster is a quarter-wave plate. In this case, even when the projection light contains, for example, linearly polarized light components of which polarization states are different from each other according to wavelengths, positioning the quarter-wave plate as the optical filter in the optical path allows each of the components of the projection light to have the same polarization state, such as circularly polarized light. As a result, unevenness in brightness and color due to the angle of the projection light with respect to a screen can be reduced at a relatively low cost.

It is preferred that the cover includes at least a light-transmissive cover glass. The cover glass used herein means a component that is disposed to protect the projection unit but does not basically attenuate the transmitted light within the visible wavelength range. In this case, projection can be carried out while the projection unit is protected from damage and dusts by using the light-transmissive cover glass.

It is preferred that an anti-reflection film is formed on each of the light-exiting surface and the light-incident surface of the cover glass. In this case, the reflection from the cover glass can be reduced, and the degradation in image quality can be reduced accordingly.

It is preferred that the optical filter and the cover glass have the same optical path length for the projection light, and are disposed in positions spaced apart from the projection unit by the same distance. In this case, the focused state of a projected image remains substantially unchanged when the color filter is switched to the cover glass and vice versa and positioned in the optical path.

It is preferred that the cover further includes a protective shutter plate, and the holder holds the optical filter, the cover glass, and the shutter plate in such a way that the optical filter, the cover glass, and the shutter plate can be selectively switched and positioned in the optical path on the light exiting-side of the projection unit. In this configuration, the optical filter and the cover glass can be protected from mechanical damage by positioning the protective shutter plate in the optical path when the operation of the projector is terminated.

It is preferred that the optical filter is the color filter, and the projector further includes a display controller that adjusts how the light modulation unit modulates light in accordance with which of the color filter and the cover glass is positioned in the optical path on the light exiting-side of the projection unit. The display controller allows light modulation corresponding to, for example, a color tone-priority mode in which a high priority is given to the color reproducibility when the color filter is positioned in the optical path, whereas allowing modulation suitable for, for example, a brightness-priority mode in which a high priority is given to the brightness when the cover glass is positioned in the optical path. That is, grayscale control can be automatically performed in accordance with the optical characteristics of the projector.

It is preferred that the holder further includes a light passage opening through which the projection light passes straight, and the holder holds the optical filter, the cover, and the light passage opening in such a way that the optical filter, the cover, and the light passage opening can be selectively switched and positioned in the optical path on the light exiting-side of the projection unit. In this case, not only can the optical filter be switched to the cover and vice versa but also they can be switched to the light passage opening and vice versa. Therefore, the projection can be carried out while the holder produces no loss of light at all by positioning the light passage opening in the optical path.

It is preferred that the holder holds at least the optical filter and the cover arranged in a direction substantially perpendicular to the optical axis of the projection unit, and the holder slides the optical filter and the cover in the direction substantially perpendicular to the optical axis. In this case, the optical filter and the cover can be housed in an extremely small space.

It is preferred that the holder holds at least the optical filter in such a way that the optical filter is inclined to the optical axis of the projection unit by a predetermined inclination angle. This configuration prevents the light reflected off the optical filter from returning to the projection unit, the light modulation unit, and other components not to cause degradation in image quality. When the cover further includes a light-transmissive cover glass, the light reflected off the cover glass can be similarly handled by inclining the cover by a predetermined inclination angle.

It is preferred that the projector further includes a stop operation controller that inhibits the projection operation from being stopped when at least the optical filter is positioned and exposed in the optical path on the light exiting-side of the projection unit. When the cover further includes a light-transmissive cover glass, for example, the stop operation controller can also inhibit the projection operation from being stopped when the cover glass is exposed, as in the case of the optical filter. The optical filter or the cover glass, when retracted from the optical path, is housed, for example, in a housing of the projector. As a result, the operation of the projector will not be terminated when the optical filter or other components remain exposed. That is, the possibility of damaging the optical filter and other components can be lowered. For example, the projector will not be stored in a storage box with the optical filter or other components remain exposed.

It is preferred that the projector further includes a driver that drives the holder so that the optical filter and the cover are switched and positioned in the optical path. In this case, the optical filter and the cover can be non-manually switched and positioned in the optical path.

BRIEF DESCRIPTION OF THE DRAWINGS

The invention will now be described with reference to the accompanying drawings, wherein like numbers reference like elements.

FIG. 3A shows a first operating position where an optical filter is in an optical path, and FIG. 3B shows a second operating position where a cover glass is in the optical path.

DESCRIPTION OF EXEMPLARY EMBODIMENTS

First Embodiment

Figure 1:
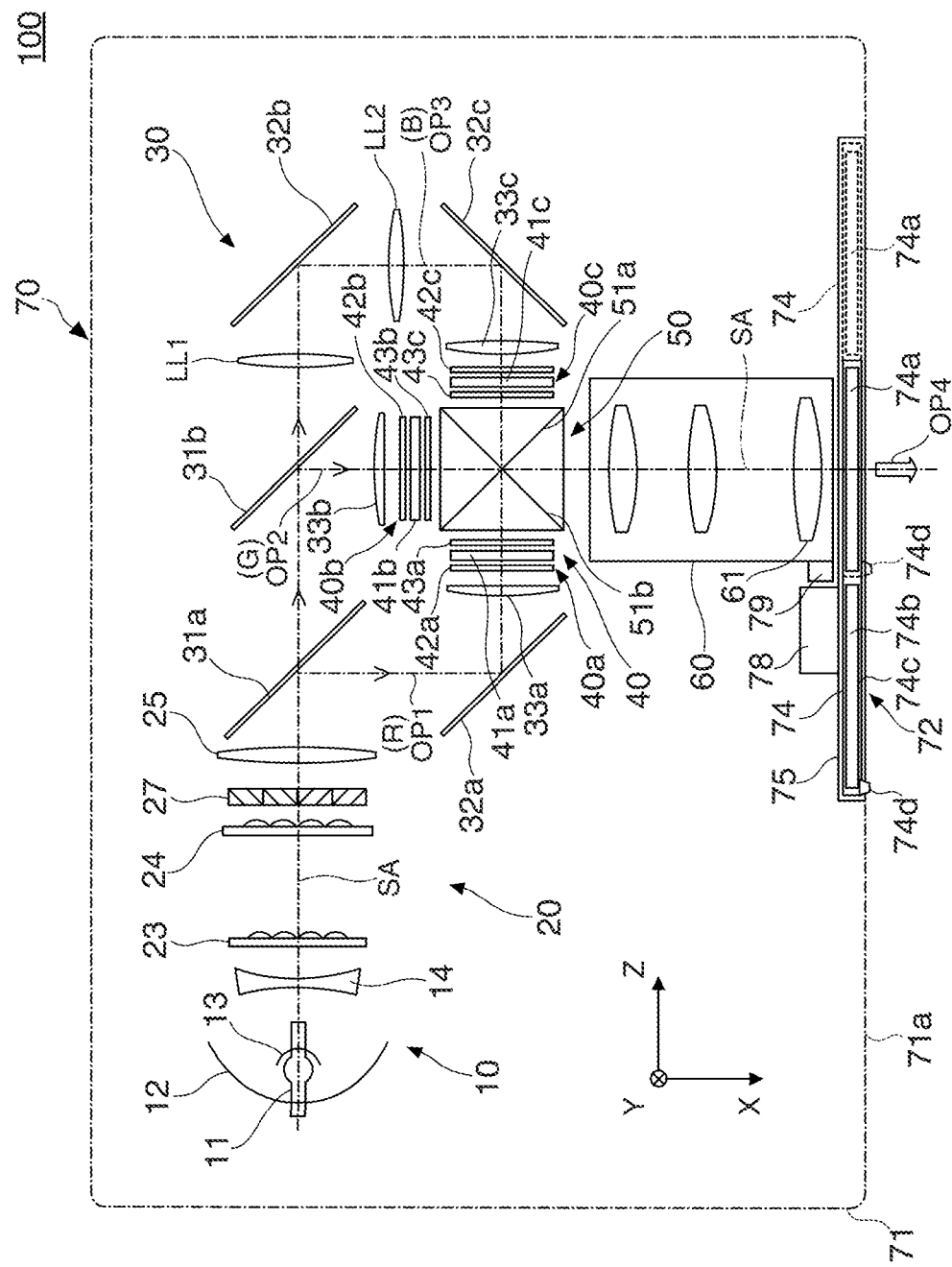
FIG. 1 is a plan view describing a projector according to a first embodiment of the invention.
Figure 2:
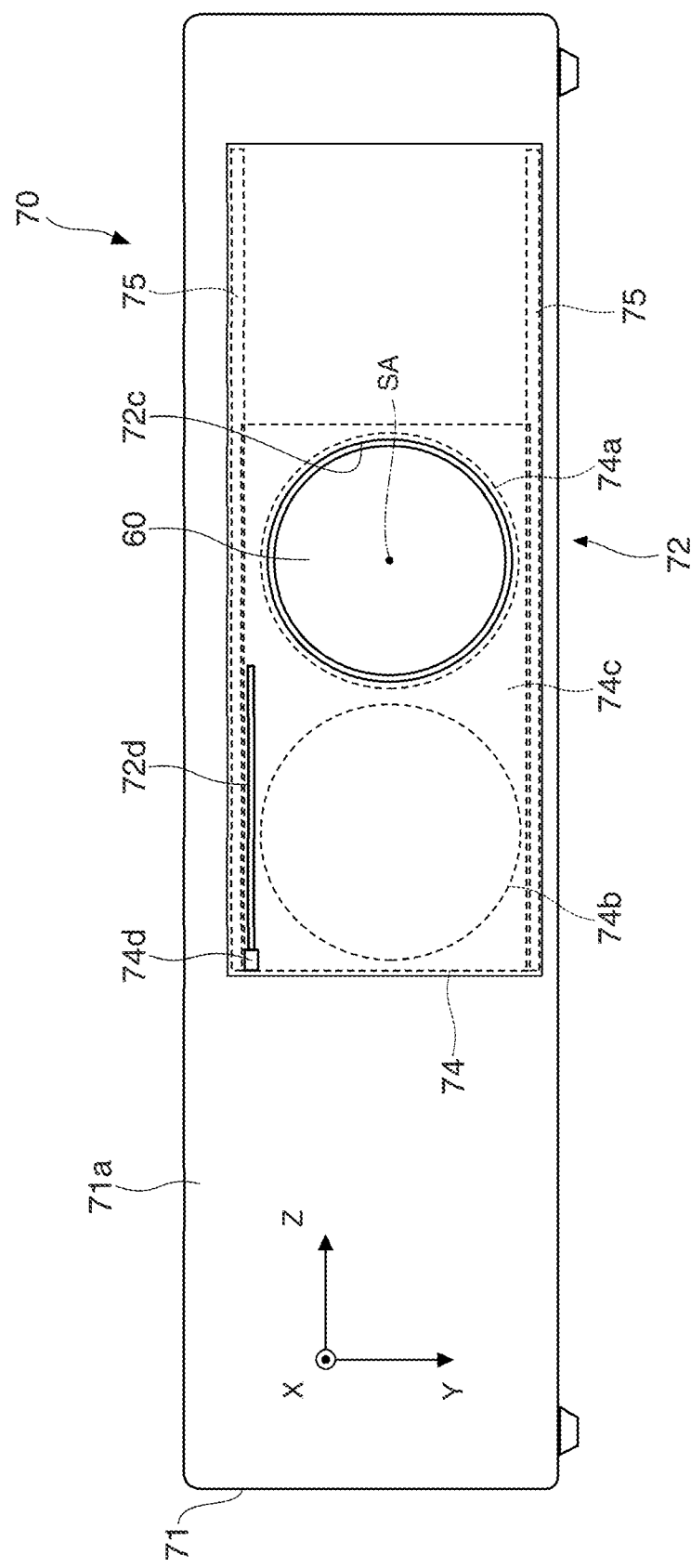
FIG. 2 is a front view of the projector shown in FIG. 1.

FIG. 1 is a plan view describing the configuration of an optical system of a projector according to a first embodiment of the invention, and FIG. 2 is a front view of the projector of the present embodiment.

A projector 100 of the present embodiment is an optical apparatus that modulates the light flux emitted from a light source in accordance with image information to form an optical image and enlarges and projects the optical image on a screen. The projector 100 includes a light source 10, a homogenizing system 20, a color separation/light guiding system 30, a light modulation unit 40, a cross dichroic prism 50, a projection lens 60, and an exterior housing 70. The light source 10 and the homogenizing system 20 form an illuminator. The light modulation unit 40 includes three liquid crystal light valves 40a, 40b, and 40c. The liquid crystal light valves 40a, 40b, and 40c are liquid crystal display devices that modulate respective different color light beams.

In the projector 100 described above, the light source 10 includes an arc tube 11 of discharge light emission type, an ellipsoidal reflector 12, a spherical sub-mirror 13, and a parallelizing lens 14. The light flux radiated from the arc tube 11 is reflected off the reflector 12 directly or via the sub-mirror 13 and becomes a convergent light flux. The convergent light flux is parallelized by the parallelizing lens 14 and incident on a first lens array 23 disposed downstream of the parallelizing lens 14, that is, disposed in the homogenizing system 20. It is noted that the ellipsoidal reflector 12 described above can be replaced with any of a variety of concave mirrors, such as a mirror using a parabolic surface. When a parabolic concave mirror is used, the parallelizing lens 14 and other components provided downstream of the reflector 12 can be omitted, but the light source 10 can still output a parallelized light flux.

The homogenizing system 20 supplies illumination light having homogenized illuminance to the light modulation unit 40. The homogenizing system 20 includes first and second lens arrays 23, 24 that divide the light flux having exited from the light source 10 into appropriate light fluxes, a superimposing lens 25 that superimposes the plurality of light fluxes having exited from the lens arrays 23 and 24, and a polarization converter 27 that aligns the polarization directions of the light fluxes to be incident on the superimposing lens 25. Each of the first and second lens arrays 23, 24 is formed of a plurality of element lenses arranged in a two-dimensional matrix in a plane perpendicular to a system optical axis SA. The element lenses that form the first lens array 23 divide the light flux having exited from the parallelizing lens 14 into a plurality of sub-light fluxes. The element lenses that form the second lens array 24 cause the sub-light fluxes from the first lens array 23 to exit at appropriate divergent angles. The superimposing lens 25 makes the sub-light fluxes as a whole having exited from the second lens array 24 and passed through the polarization converter 27 convergent as appropriate and superimposes the convergent sub-light fluxes in illuminated areas or display areas of the downstream liquid crystal light valves 40a, 40b, and 40c. That is, the first and second lens arrays 23, 24 and the superimposing lens 25 function as an optical integration system that homogenizes the illumination light. The polarization converter 27 serves to align the polarization directions of the sub-light fluxes having been divided by the first lens array 23 and having passed through the second lens array 24 into linearly polarized light beams polarized in a single direction. The polarization converter 27 is a prism array having a structure in which, for example, four prism elements are arranged in the X direction, each of the prism elements including a PBS or a wave plate and extending in the Y direction. The number of prism elements that form the prism array is not limited to four, but can be changed as appropriate in accordance with the specifications of the projector 100.

The color separation/light guiding system 30 includes first and second dichroic mirrors 31a, 31b, reflection mirrors 32a, 32b, and 32c, and three field lenses 33a, 33b, and 33c. The color separation/light guiding system 30 separates the illumination light having exited from the homogenizing system 20 into, red (R), green (G), and blue (B), three color light beams, and guides the color light beams to the respective downstream liquid crystal light valves 40a, 40b, and 40c. More specifically, the first dichroic mirror 31a reflects the R light beam of the RGB three color light beams and transmits the G and B light beams. The second dichroic mirror 31b reflects the G light beam of the GB two color light beams and transmits the B light beam. In the color separation/light guiding system 30, the R light beam reflected off the first dichroic mirror 31a is incident on the field lens 33a for adjusting the angle of incidence via the reflection mirror 32a. The G light beam having passed through the first dichroic mirror 31a and having been reflected off the second dichroic mirror 31b is incident on the field lens 33b for adjusting the angle of incidence. Further, the B light beam having passed through the second dichroic mirror 31b is incident on the field lens 33c for adjusting the angle of incidence via relay lenses LL1 and LL2 and the reflection mirrors 32b and 32c.

In the light modulation unit 40, each of the liquid crystal light valves 40a, 40b, and 40c serves as a non-luminous light modulator that modulates the spatial intensity distribution of the incident illumination light. The liquid crystal light valves 40a, 40b, and 40c include three liquid crystal panels 41a, 41b, and 41c illuminated with the respective color light beams having exited from the color separation/light guiding system 30, three first polarizing filters 42a, 42b, and 42c disposed on the light-incident sides of the liquid crystal panels 41a, 41b, and 41c, and three second polarizing filters 43a, 43b, and 43c disposed on the light-exiting sides of the liquid crystal panels 41a, 41b, and 41c.

In the light modulation unit 40, the R light beam reflected off the first dichroic mirror 31a is incident on the liquid crystal light valve 40a via the field lens 33a and other components disposed along a first optical path OP1 and illuminates the display area of the liquid crystal panel 41a, which forms the liquid crystal light valve 40a. The G light beam having passed through the first dichroic mirror 31a and having been reflected off the second dichroic mirror 31b is incident on the liquid crystal light valve 40b via the field lens 33b and other components disposed along a second optical path OP2 and illuminates the display area of the liquid crystal panel 41b, which forms the liquid crystal light valve 40b. The B light beam having passed through the first and second dichroic mirrors 31a, 31b is incident on the liquid crystal light valve 40c via the field lens 33c and other components disposed along a third optical path OP3 and illuminates the display area of the liquid crystal panel 41c, which forms the liquid crystal light valve 40c. Each of the liquid crystal panels 41a to 41c modulates the spatial distribution of the illumination light incident thereon, and the polarization state of each of the three color light beams incident on the respective liquid crystal panels 41a to 41c is adjusted on a pixel basis. In this process, the first polarizing filters 42a to 42c adjust the polarization directions of the respective illumination light beams to be incident on the liquid crystal panels 41a to 41c, and the second polarizing filters 43a to 43c extract modulated light beams having a predetermined polarization direction from the modulated light beams having exited from the liquid crystal panels 41a to 41c. The liquid crystal light valves 40a, 40b, and 40c thus form respective modulated color light beams or color image light beams.

The cross dichroic prism 50 serves as an image light beam combining system that combines the color image light beams from the liquid crystal light valves 40a, 40b, and 40c. More specifically, the cross dichroic prism 50 is formed by bonding four rectangular prisms and thus has a substantially square shape in a plan view. A pair of dielectric multilayer films 51a and 51b is formed along the interfaces between these bonded rectangular prisms, and the dielectric multilayer films 51a and 51b thus intersect each other to form an X shape. One of the dielectric multilayer films, the first dielectric multilayer film 51a, reflects the R light, whereas the other one, the second dielectric multilayer film 51b, reflects the B light. In the cross dichroic prism 50, the R light from the liquid crystal light valve 40a is reflected off the dielectric multilayer film 51a and directed to the right when viewed forward in the traveling direction. The G light from the liquid crystal light valve 40b passes through the dielectric multilayer films 51a and 51b and goes straight through the cross dichroic prism 50. The B light from the liquid crystal light valve 40c is reflected off the dielectric multilayer film 51b and directed to the left when viewed forward in the travelling direction. The cross dichroic prism 50 thus combines the R, G, and B light beams to form combined light, which is color image light.

The projection lens 60 is a projection unit that enlarges the combined image light formed in the cross dichroic prism 50 at a desired magnification and projects the color image on a screen (not shown). In this process, the image light having passed through the projection lens 60 then passes along a light-exiting optical path OP4 through a projection window apparatus 72 provided in the exterior housing 70. The projection lens 60 is not limited to a projection unit formed of only lenses, but may be a projection unit formed of an optical system including a mirror and other components.

The exterior housing 70 includes a housing body 71 and the projection window apparatus 72. The housing body 71 houses the optical system section formed of the light source 10, the homogenizing system 20, the color separation/light guiding system 30, the light modulation unit 40, the cross dichroic prism 50, and the projection lens 60 described above, and protects these components from external environments. The projection window apparatus 72 is an embodiment of a holder in which a color filter 74a as an optical filter and a light-transmissive cover glass 74b are incorporated. The color filter 74a is an optical filter having a function of adjusting the wavelength distribution of the light passing therethrough, and allows color reproducibility-priority projection when positioned in the optical path. The projection window apparatus 72 fits in a front panel 71a of the housing body 71 and is secured there. The projection window apparatus 72 has a function of protecting the front side of the projection lens 60 and adjusting the color tone of the projection light in accordance with the usage conditions. To this end, the projection window apparatus 72 includes a movable member 74 that supports the color filter 74a and the cover glass 74b disposed adjacent to each other, guide members 75 that slidably hold the movable member 74, and a driver 78 that delivers a driving force to the movable member 74 to slide it at a necessary timing. The entire front side of the projection window apparatus 72 is covered with a shielding member, but a circular opening 72c through which the projection light passes is provided in a position facing the projection lens 60, as shown in FIG. 2.

In the projection window apparatus 72, the movable member 74 includes not only the color filter 74a and the cover glass 74b but also a frame 74c that supports the color filter 74a and the cover glass 74b in the same plane. The frame 74c, when guided along the guide members 75, which will be described later in detail, can make a reciprocating motion in the Z direction perpendicular to the system optical axis SA. As a result, the position of the movable member 74 is switched between a first operating position where the center of the color filter 74a coincides with the system optical axis SA as shown in FIG. 3A and a second operating position where the center of the cover glass 74b coincides with the system optical axis SA as shown in FIG. 3B. The Z direction, in which the movable member 74 moves, is perpendicular to the optical axis of the projection lens 60 and parallel to the XZ plane in which the bottom of the housing body 71 extends. The movable member 74 can be moved, for example, when a user operates a knob 74d protruding from the front panel 71a. The knob 74d is fixed to the frame 74c of the movable member 74, and when the operating position is switched, the knob 74d is moved along a slot 72d formed in the front panel 71a.

The guide members 75 hold the movable member 74 substantially perpendicular to the system optical axis SA and guide the movable member 74 to cause it to make a reciprocating motion between the first operating position shown in FIG. 3A and the second operating position shown in FIG. 3B. To this end, each of the guide members 75 includes a guide groove (not shown) that extends in the Z direction, and the upper and lower edges of the frame 74c fit in the guide grooves.

The guide members 75 allow the movable member 74 to be located between the first operating position and the second operating position, but can stably hold the movable member 74 by using a latch or any other suitable component (not shown) only in the first and second operating positions. In this case, one of the color filter 74a and the cover glass 74b is aligned with the system optical axis SA and positioned there. The guide members 75 can hold the frame 74c in a slightly inclined position. In this case, the color filter 74a and the cover glass 74b are not perpendicular to the system optical axis SA but slightly shifted from their vertical positions. Inclining the color filter 74a and the cover glass 74b by an inclination angle, for example, ranging from approximately 1 to 10 degrees prevents the light reflected off the color filter 74a or the cover glass 74b from returning to the projection lens 60, the light modulation unit 40 and other components not to cause degradation in image quality.

The driver 78, detailed description of which is omitted, includes a motor and a mechanical mechanism. For example, the user can remotely control the operation of the driver 78 to move the movable member 74 to the first or second operating position at a necessary timing.

The role of the projection window apparatus 72 will now be described. When the movable member 74 is in the first operating position shown in FIG. 3A and the color filter 74a is positioned in front of the projection lens 60, the portion of the projection light that is within a specific wavelength range is attenuated, whereby the color reproducibility can be improved. When the movable member 74 is in the second operating position shown in FIG. 3B and the cover glass 74b is positioned in front of the projection lens 60 to block the opening 72c, the cover glass 74b covers the projection lens 60 without substantially attenuating the projection light and can directly protect the projection lens 60. To meet recent demands for wider angle imaging, a first lens 61 disposed on the light-exiting side in the projection lens 60 is made of plastic or a special material that is easily scratched. The first lens 61 is however protected from external factors because one of the color filter 74a and the cover glass 74b is in front of the first lens 61. That is, the front side of the projection lens 60 is covered with the projection window apparatus 72 in any situation including transportation, whereby the projection lens 60 is reliably protected, for example, from being scratched. Further, dusts will not adhere to the surface of the projection lens 60 or get in the projection lens 60. When the color filter 74a is, for example, relatively easily damaged, moving the movable member 74 to the second operating position when the projector 100 is not in use allows the cover glass 74b to function as a cover that protects the projection lens 60.

Figure 4A:
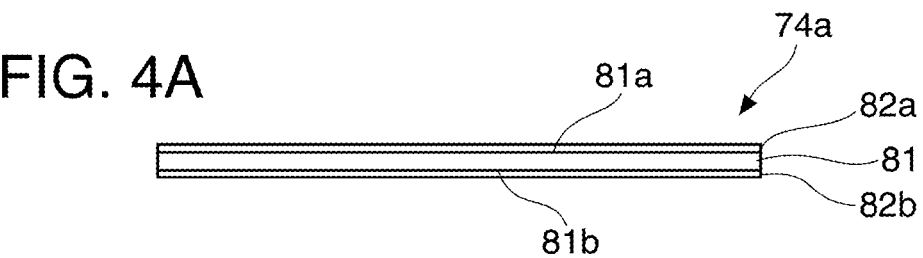
FIG. 4A is a cross-sectional view of an optical filter.
Figure 4B:
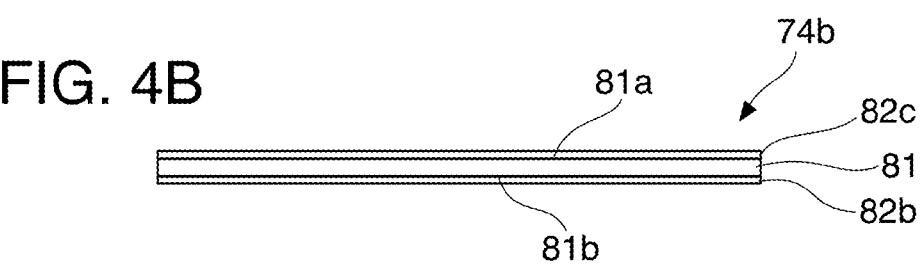
FIG. 4B is a cross-sectional view of a cover glass.

FIG. 4A is a cross-sectional view describing the structure of the color filter 74a, and FIG. 4B is a cross-sectional view describing the structure of the cover glass 74b.

Figure 4C:
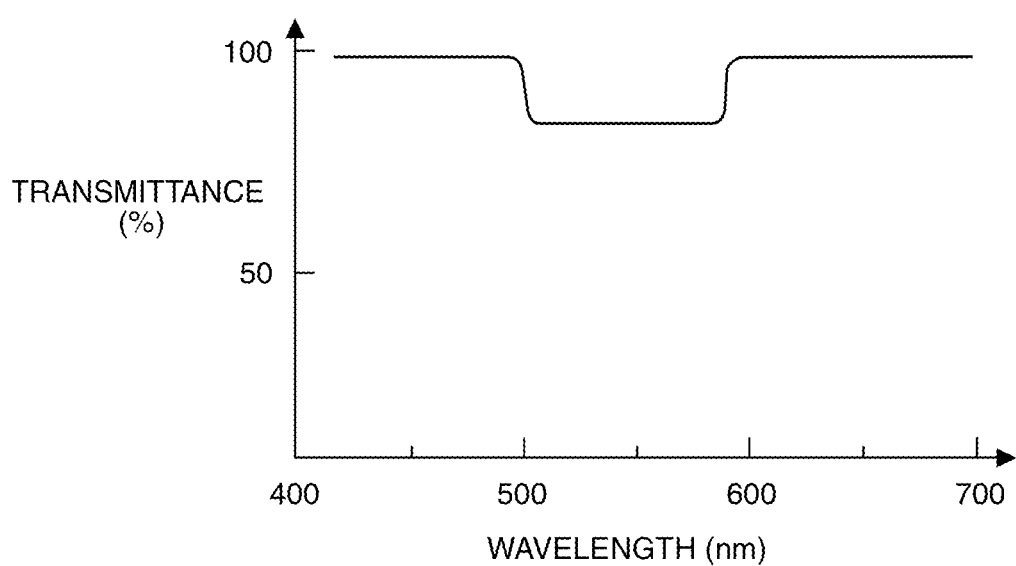
FIG. 4C is a graph describing the transmittance-wavelength characteristic of the optical filter.

First, the color filter 74a shown in FIG. 4A includes a flat plate-shaped, light-transmissive substrate 81, an optical filter layer 82a provided on one side of the substrate 81, and an anti-reflection film 82b provided on the other side of the substrate 81. The light-transmissive substrate 81 is a flat plate made of white glass or any other glass material whose characteristics do not particularly depend on wavelength. The optical filter layer 82a is formed on a light exiting-side flat surface 81a, and the anti-reflection film 82b is formed on a light incident-side flat surface 81b. The optical filter layer 82a is formed of a dielectric multilayer film having a transmittance-wavelength characteristic, for example, shown in FIG. 4C. That is, the optical filter layer 82a attenuates as appropriate only part of the projection light incident on the color filter 74a, that is, the light flux within the G-light wavelength range. The anti-reflection film 82b is formed of a dielectric monolayer or multilayer film and prevents the projection light incident on the color filter 74a from being reflected off the flat surface 81b of the light-transmissive substrate 81. The transmittance-wavelength characteristic of the anti-reflection film 82b, although not illustrated, is designed to preferentially prevent, for example, R light reflection, although the wavelength characteristic thereof can be designed to uniformly prevent RGB light reflection. The reason for this is that, considering that the optical filter layer 82a attenuates the G light and the anti-reflection film 82b shares part of the function of the optical filter layer 82a, the anti-reflection film 82b only needs to prevent R light reflection or R and B light reflection.

The cover glass 74b shown in FIG. 4B is formed of the flat plate-shaped, light-transmissive substrate 81 made of white glass or any other glass material whose characteristics do not particularly depend on wavelength. An anti-reflection film 82c is formed on the light exiting-side flat surface 81a of the light-transmissive substrate 81, and an anti-reflection film 82b is formed on the light incident-side flat surface 81b of the light-transmissive substrate 81. Each of the anti-reflection films 82c and 82b has a transmittance-wavelength characteristic that prevents, for example, RGB light reflection uniformly, that is, having little dependence on wavelength.

In the above description, the optical path length of the color filter 74a along the system optical axis SA is equal to that of the cover glass 74b along the system optical axis SA. That is, the optical distance obtained by integrating the thickness of the color filter 74a with respect to its refractive index is equal to the optical distance obtained by integrating the thickness of the cover glass 74b with respect to its refractive index. Further, the length from the light-exiting end of the projection lens 60 to the light-incident surface of the color filter 74a along the optical path is equal to the distance from the light-exiting end of the projection lens 60 to the light-incident surface of the cover glass 74b along the optical path. In this configuration, the focused state of an image projected by the projection lens 60 remains substantially unchanged when the color filter 74a is switched to the cover glass 74b and vice versa and positioned in the system optical axis SA.

Figure 5:
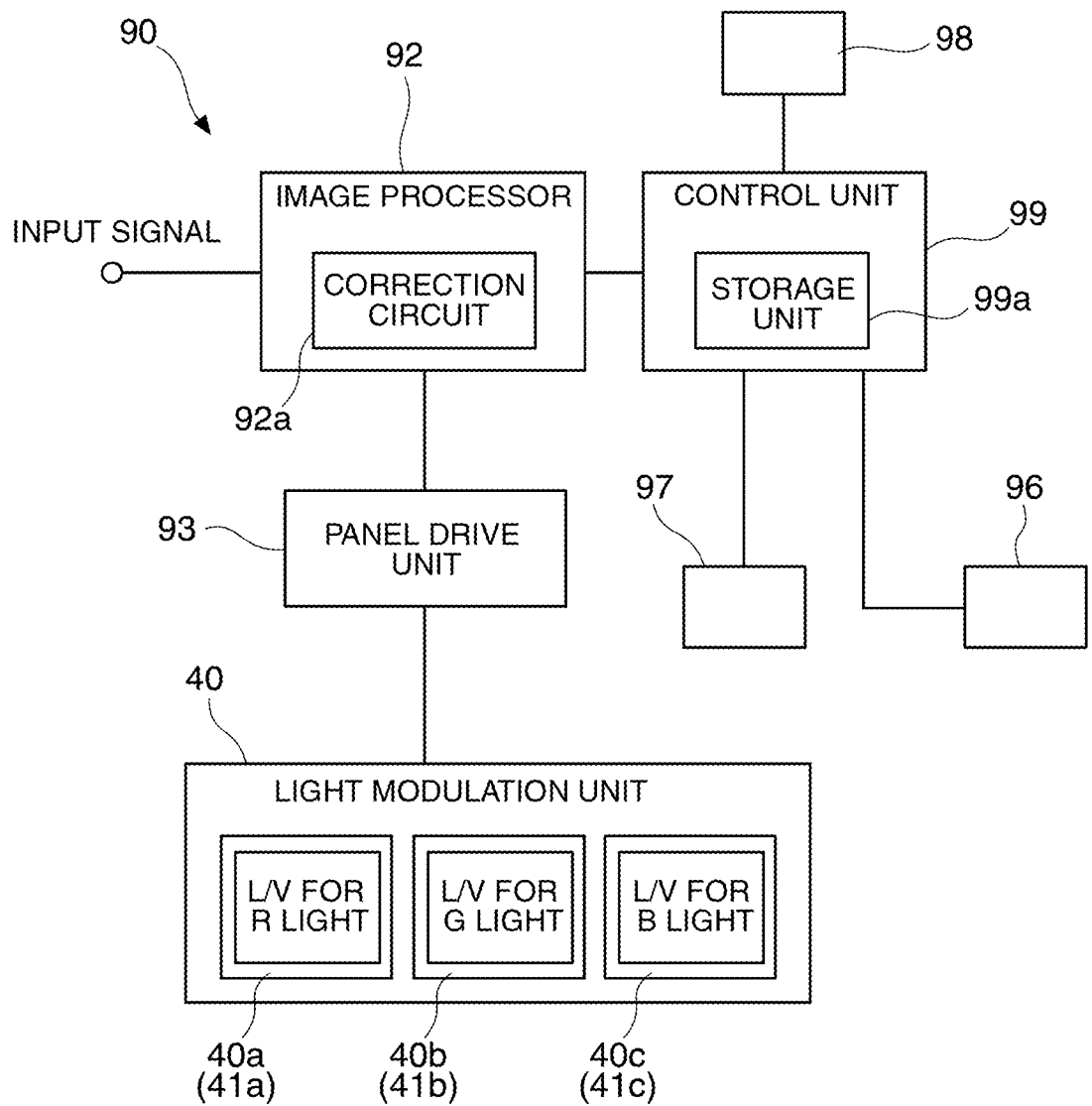
FIG. 5 is a block diagram describing a circuit section that controls the projector shown in FIG. 1.

FIG. 5 is a block diagram conceptually describing a circuit section 90 for controlling the operation of the projector 100 shown in FIG. 1 and other portions thereof. The circuit section 90 includes an image processor 92 that performs necessary image processing on an externally inputted signal, such as a video signal, a panel drive unit 93 that drives the liquid crystal panels 41a, 41b, and 41c based on the output from the image processor 92, a position sensor 96 that detects the state of the projection window apparatus 72, a projection window drive unit 97 that controls the operation of the driver 78 for driving the projection window apparatus 72, a key input unit 98 operated by the user, and a main control unit 99 that oversees the operations of the above components.

Among the components in the circuit section 90, the image processor 92 converts the video signal into a signal suitable to operate the panel drive unit 93, and includes an image correction circuit 92a that performs correction on the input image signal as appropriate. The image processor 92 or the image correction circuit 92a carries out a variety of image processing operations on the video signal, such as grayscale correction, color correction, color unevenness correction, and distortion correction, based on instructions from the main control unit 99.

The panel drive unit 93 produces a drive signal used to adjust the display state of each of the liquid crystal panels 41a, 41b, and 41c based on the image signal having undergone the image processing and having been outputted from the image processor 92. The liquid crystal light valves 40a, 40b, and 40c for the respective colors, in which the liquid crystal panels 41a, 41b, and 41c are incorporated, can form images (moving images or still images) in the form of transmittance distribution in accordance with the image signal outputted from the image processor 92.

The position sensor 96 detects which of the first operating position shown in FIG. 3A and the second operation position shown in FIG. 3B the movable member 74 of the projection window apparatus 72 is in. That is, the position sensor 96 detects which of the color filter 74a and the cover glass 74b is in the light exiting-side optical path OP4 extending forward from the projection lens 60 and outputs the detection result to the main control unit 99.

The projection window drive unit 97 supplies electric power to the driver 78 at a necessary timing based on a control signal from the main control unit 99, and slides the movable member 74 to the first or second operating position so that the color filter 74a is switched to the cover glass 74b and vice versa.

The key input unit 98 is an operation unit for the user and functions as an input device for inputting a user's instruction to the main control unit 99. The user can operate the key input unit 98 to make general adjustments on the projection state of the projector 100. Further, the user can operate the key input unit 98 to instruct the projection window drive unit 97 for the window switching operation. That is, the user can operate the key input unit 98 to locate the movable member 74 in the first or second operating position, whereby the color filter 74a or the cover glass 74b can be alternately positioned in the light exiting-side optical path OP4 extending forward from the projection lens 60. The key input unit 98 can be replaced with a remote operation device having the same function as that of the key input unit 98 or can be used in combination with the remote operation device.

The main control unit 99 serves as a controller that controls the overall operation of the projector 100. The main control unit 99 is formed of a microcomputer and other components and further includes a built-in storage unit 99a for holding a variety of data necessary for the operation of the projector 100. The storage unit 99a stores, for example, a variety of programs used to operate the projector 100, and keeps the projector 100 operating appropriately. The main control unit 99 adjusts as appropriate how the light modulation unit 40 modulates the illumination light in accordance with which of the color filter 74a and the cover glass 74b is positioned in the optical path OP4 on the light-exiting side of the projection lens 60.

Figure 6:
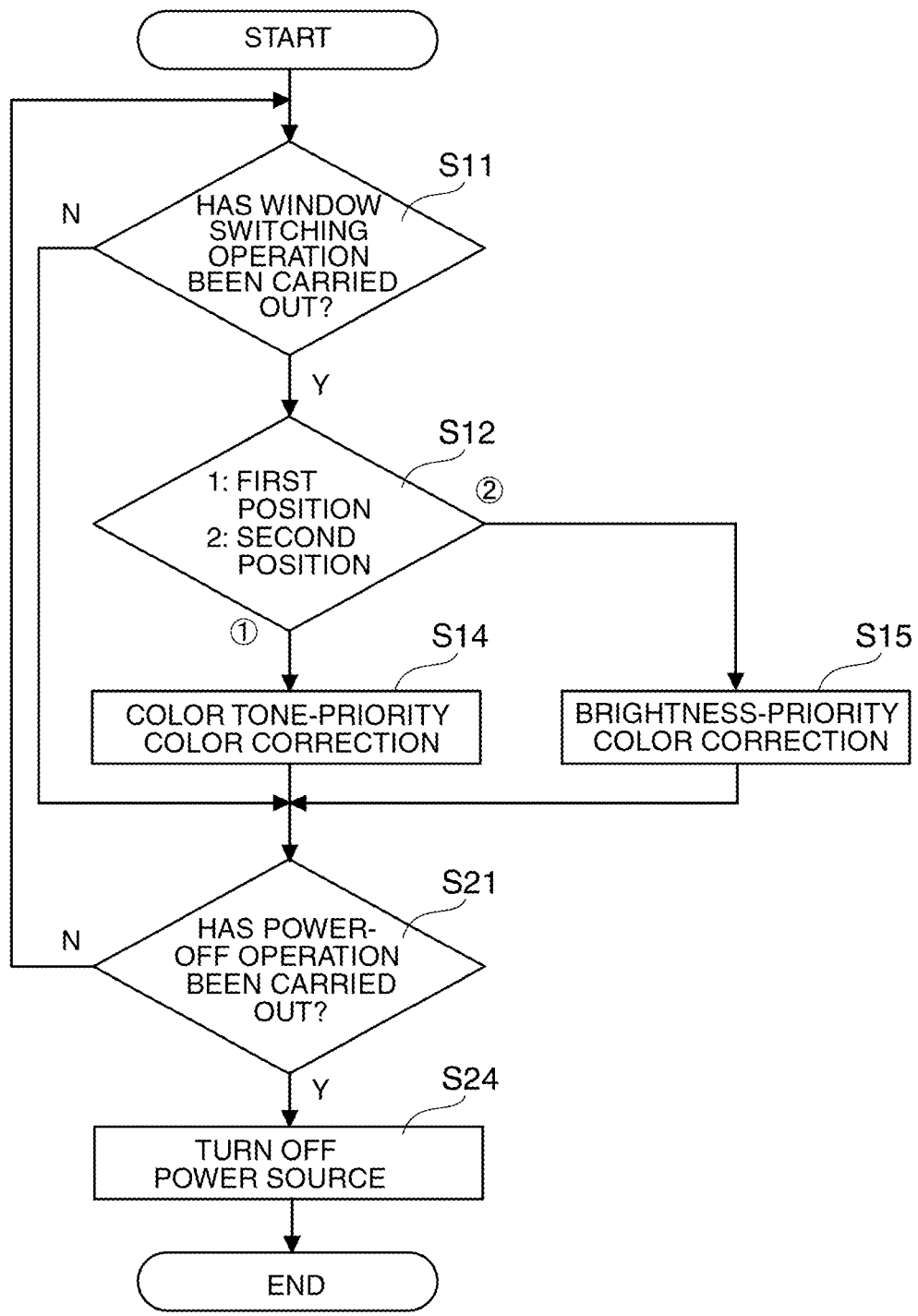
FIG. 6 is a flowchart describing an exemplary operation of the projector shown in FIG. 1.

FIG. 6 is a flowchart describing a specific example of the operation of the circuit section 90 shown in FIG. 5. It is assumed in this case that the projector 100 has started its projection operation, for example, in response to a user's key operation.

First, the main control unit 99 checks the detection output from the position sensor 96 and detects whether or not the projection window drive unit 97 has carried out the window switching operation (step S11). Specifically, when the movable member 74 has moved from the first operating position shown in FIG. 3A to the second operating position shown in FIG. 3B, or when the movable member 74 has moved from the second operating position shown in FIG. 3B to the first operating position shown in FIG. 3A, the main control unit 99 judges that the window switching operation has been carried out.

The main control unit 99 then changes processes to be carried out based on the detection result from the position sensor 96 (step S12).

When the main control unit 99 judges from the detection result from the position sensor 96 that the movable member 74 is in the first operating position shown in FIG. 3A, the main control unit 99 keeps instructing the image processor 92 to perform image processing including color correction on the input signal (color tone-priority mode), and instructing the panel drive unit 93 to perform the display operations of the liquid crystal panels 41a, 41b, and 41c (step S14). In the color correction in the color tone-priority mode, the image processor 92 refers to a grayscale adjustment table stored, for example, in the storage unit 99a in the main control unit 99. The color correction performed by the image processor 92 in the color tone-priority mode is color tone-priority color correction. That is, in this state, since the movable member 74 is in the first operating position and the color filter 74a is in the light exiting-side optical path OP4 extending forward from the projection lens 60, the G image component is attenuated. Therefore, grayscale correction that compensates the amount of light attenuated by the color filter 74a is performed on the G component primarily corresponding to the liquid crystal panel 41b, whereby the RGB illumination light can be modulated in a well balanced manner, and the colors of the projected image are well reproduced. The color tone-priority color correction described above can involve not only the G-component grayscale correction but also R-component and/or B-component grayscale correction. In this way, the color reproducibility of the projected image can be further improved. The color tone-priority color correction can include typical image processing, such as color unevenness correction by which color unevenness in an image is reduced and shape distortion correction by which shape distortion in an image is corrected.

On the other hand, when the main control unit 99 judges from the detection result from the position sensor 96 that the movable member 74 is in the second operating position shown in FIG. 3B, the main control unit 99 keeps instructing the image processor 92 to perform image processing including color correction on the input signal (brightness-priority mode), and instructing the panel drive unit 93 to perform the display operations of the liquid crystal panels 41a, 41b, and 41c (step S15). In the color correction in the brightness-priority mode, the image processor 92 refers to a grayscale adjustment table stored, for example, in the storage unit 99a in the main control unit 99. The color correction performed by the image processor 92 in the brightness-priority mode is brightness-priority color correction. That is, in this state, since the movable member 74 is in the second operating position and the cover glass 74b is in the light exiting-side optical path OP4 extending forward from the projection lens 60, the image components for the respective colors are not attenuated. However, since the color tone is desirably as natural as possible even in the brightness-priority mode, grayscale correction is performed on each of the colors to the extent that the brightness is compromised. The brightness-priority color correction can include color unevenness correction by which color unevenness in an image is reduced and shape distortion correction by which shape distortion in an image is corrected. Alternatively, instead of particularly performing the brightness-priority color correction described above, only color unevenness correction, shape distortion correction, and other typical image processing can be performed.

In the display operations in the color tone-priority mode and the brightness-priority mode described above, the main control unit 99 and the image processor 92 function as a display controller that adjusts how the illumination light is modulated.

The main control unit 99 next checks any operation performed on the key input unit 98 or other components and judges whether or not the user has carried out a power-off operation (step S21). When the user has not carried out the power-off operation, the control returns to the first step S11 and the operations described above are repeated. When the user has carried out the power-off operation, the control proceeds to the following step S24 and a power-off routine is executed. That is, the display operations of the liquid crystal panels 41a, 41b, and 41c are terminated, and the light source 10 is turned off.

Figure 7:
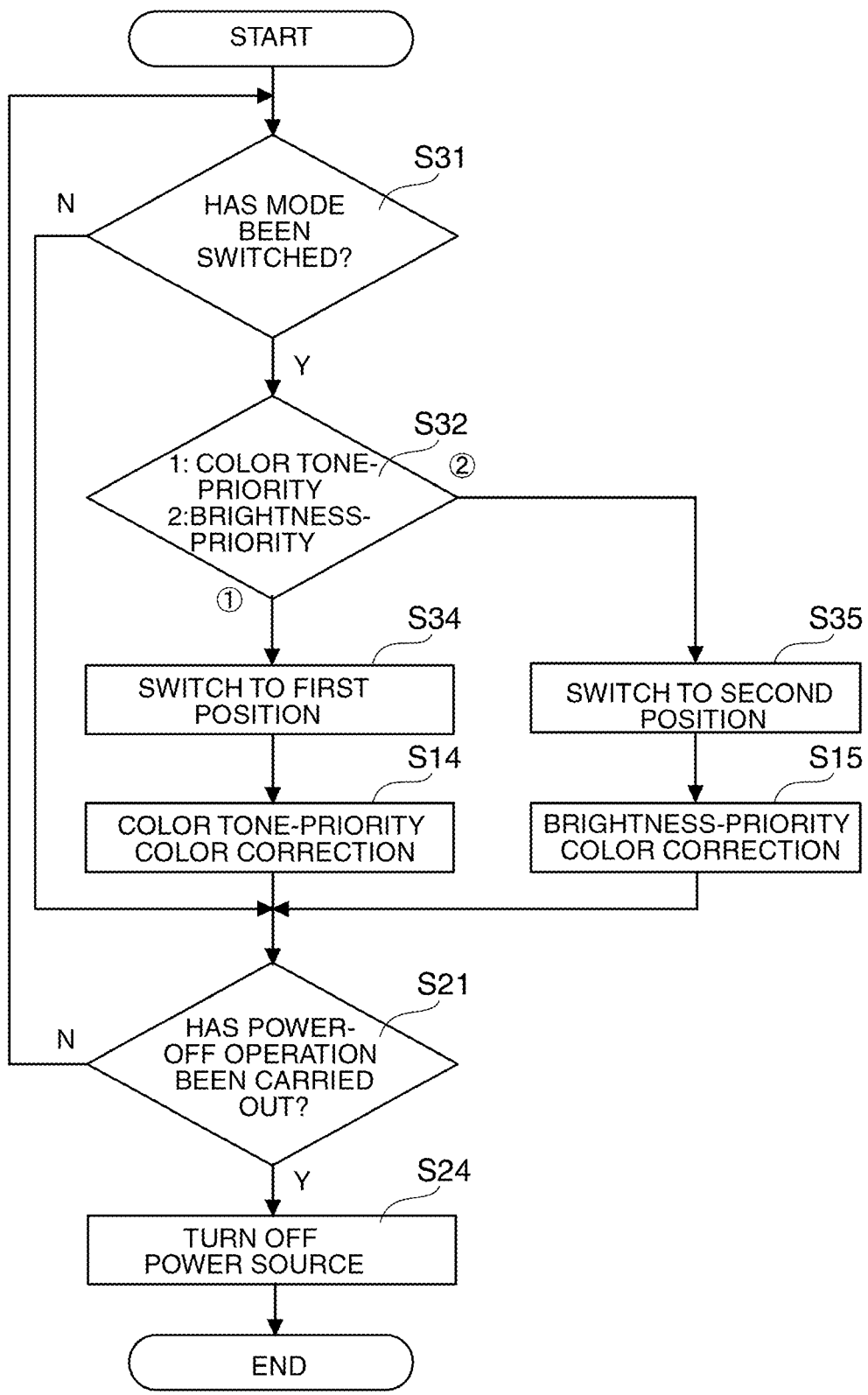
FIG. 7 is a flowchart describing another exemplary operation of the projector shown in FIG. 1.

FIG. 7 is a flowchart describing a variation of the operation shown in FIG. 6. In this case, the main control unit 99 checks in advance any operation performed on the key input unit 98 or other components and judges whether or not the user has switched the display mode (step S31). When the display mode has been switched, processes to be carried out are changed in accordance with the mode chosen in the switching operation (step S32). That is, when the user has chosen the color tone-priority mode, the main control unit 99 instructs the projection window drive unit 97 to operate the driver 78 so that the movable member 74 is located in the first operating position shown in FIG. 3A (step S34). The main control unit 99 then instructs the image processor 92 to perform image processing including color correction on the input signal in the color tone-priority mode (step S14). On the other hand, when the user has chosen the brightness-priority mode, the main control unit 99 instructs the projection window drive unit 97 to operate the driver 78 so that the movable member 74 is located in the second operating position shown in FIG. 3B (step S35). The main control unit 99 then instructs the image processor 92 to perform image processing including color correction on the input signal in the brightness-priority mode (step S15).

As apparent from the above description, according to the projector 100 of the present embodiment, the projection window apparatus 72 as a holder holds the color filter 74a and the cover glass 74b in such a way that they can be alternately switched and positioned in the optical path OP4 on the light-exiting side of the projection lens 60 as the projection unit. In this configuration, when the movable member 74 is in the first operating position and the color filter 74a is positioned in the light exiting-side optical path OP4, the display mode is automatically judged and the image projection can be carried out in the color tone-priority mode, in which a high priority is given to the color reproducibility. On the other hand, when the movable member 74 is in the second operating position and the cover glass 74b is positioned in the light exiting-side optical path OP4, the display mode is automatically judged and the projection can be carried out in the brightness-priority mode, in which a high priority is given to the brightness. Since the projection window apparatus 72 can switch the color filter 74a to the cover glass 74b and vice versa and positions the color filter 74a or the cover glass 74b in the optical path OP4 on the light-exiting side of the projection lens 60, the color filter 74a and the cover glass 74b along with the projection window apparatus 72 can be incorporated in a small space in the projector 100, which eliminates the need to change the basic configuration of an optical engine in the projector 100. The optical engine used herein primarily means the color separation/light guiding system 30, the light modulation unit 40, and the cross dichroic prism 50.

Second Embodiment

A projector of a second embodiment will be described below with reference to FIG. 8. A projector 100 of the present embodiment is a variation of the projector 100 of the first embodiment. The portions that will not be particularly described are the same as those in the first embodiment, and illustration and overall description will be omitted.

The projector 100 of the present embodiment includes a quarter-wave plate 74h as the optical filter in the projection window apparatus 72, the quarter-wave plate 74h being a polarization adjuster that adjusts the polarization state of the light that passes therethrough. That is, the movable member 74 supports the quarter-wave plate 74h and the cover glass 74b in the same plane in the frame 74c, and the projection window apparatus 72 can alternately position one of the quarter-wave plate 74h and the cover glass 74b in the optical path OP4 on the light-exiting side of the projection lens 60. In the present embodiment, among the liquid crystal light valves 40a, 40b, and 40c, the liquid crystal light valves 40a and 40c corresponding to the R and B light have half-wave plates 44a and 44c, by way of example, disposed upstream of the first polarizing filters 42a and 42c in the respective optical paths. On the other hand, no half-wave plate is provided in the liquid crystal light valve 40b corresponding to the G light. As a result, the R light and the B light differ from the G light in terms of polarization state in the liquid crystal light valves 40a, 40b, and 40c.

The configuration of the projector 100 of the present embodiment will be specifically described below. First, the polarization converter 27 in the homogenizing system 20 converts the illumination light formed of the color light beams into S-polarized light SS polarized, for example, in the direction perpendicular to the plane of view. Among the color light beams incident on the respective liquid crystal light valves 40a, 40b, and 40c, the R and B light beams are converted by the half-wave plates 44a and 44c into P-polarized light PP polarized in the direction parallel to the plane of view and incident on the liquid crystal panels 41a and 41c. On the other hand, the G light, which remains the S-polarized light SS, is incident on the liquid crystal panel 41b. The liquid crystal panels 41a, 41b, and 41c, the first polarizing filters 42a, 42b, and 42c, and other components are designed in accordance with the states of the respective linearly polarized color light beams incident thereon. The R and B light beams having passed through the liquid crystal panels 41a and 41c are converted from the P-polarized light PP into the S-polarized light SS, which is the light to be projected as an image, and incident on the cross dichroic prism 50. On the other hand, the G light beam having passed through the liquid crystal panel 41b is converted from the S-polarized light SS into the P-polarized light PP, which is the light to be projected as an image, and incident on the cross dichroic prism 50. Since the R and B light beams have been converted into the S-polarized light SS, the dielectric multilayer films 51a and 51b corresponding to the R and B light beams in the cross dichroic prism 50 reflect the R and B light beams in a satisfactory manner. On the other hand, since the G light beam has been converted into the P-polarized light PP, the dielectric multilayer films 51a and 51b transmit the G light beam in a satisfactory manner. That is, the loss of light produced when the light passes through the cross dichroic prism 50 is reduced by polarizing the R and B light beams differently from the G light beam. The projection light having passed through the cross dichroic prism 50 and the projection lens 60 then passes through the quarter-wave plate 74h in the projection window apparatus 72. The optic axis of the quarter-wave plate 74h is inclined to the polarization directions of the color light beams by 45 degrees. Therefore, for each of the color light beams, a phase difference corresponding to the quarter wavelength is produced between the component parallel to the optic axis and the component perpendicular thereto, whereby each of the color light beams is circularly polarized. The R, G, and B light beams, which are the components of the projection light, therefore exit as circularly polarized light.

When linearly polarized light is projected on an illuminated object, such as a screen, the way the light is reflected off the illuminated object depends on the angle of incidence. When the color light beams are linearly polarized in different directions, and the projection is carried out obliquely, that is, the angle of incidence to the screen is relatively large, or the viewer faces the screen at an oblique angle, a projected image will be unbalanced in terms of color tone, possibly resulting in unevenness in brightness and color. In contrast, in the present embodiment, converting each of the color light beams into circularly polarized light by the quarter-wave plate 74h makes the polarization states uniform, whereby the degree of unevenness in brightness and color can be reduced, for example, when the projection is carried out obliquely. In this case, since the quarter-wave plate 74h is disposed outside the projection lens 60, a durable but expensive material is not necessary and a relatively inexpensive material can be used, as compared to a case where the quarter-wave plate 74h is inserted in a position where the optical density is relatively high, for example, a position between the liquid crystal panels 41a, 41b, and 41c and the projection lens 60. Further, the angular position adjustment of the quarter-wave plate 74h, which is necessary to reliably convert linearly polarized light into circularly polarized light, can be relatively readily made.

Figure 9:
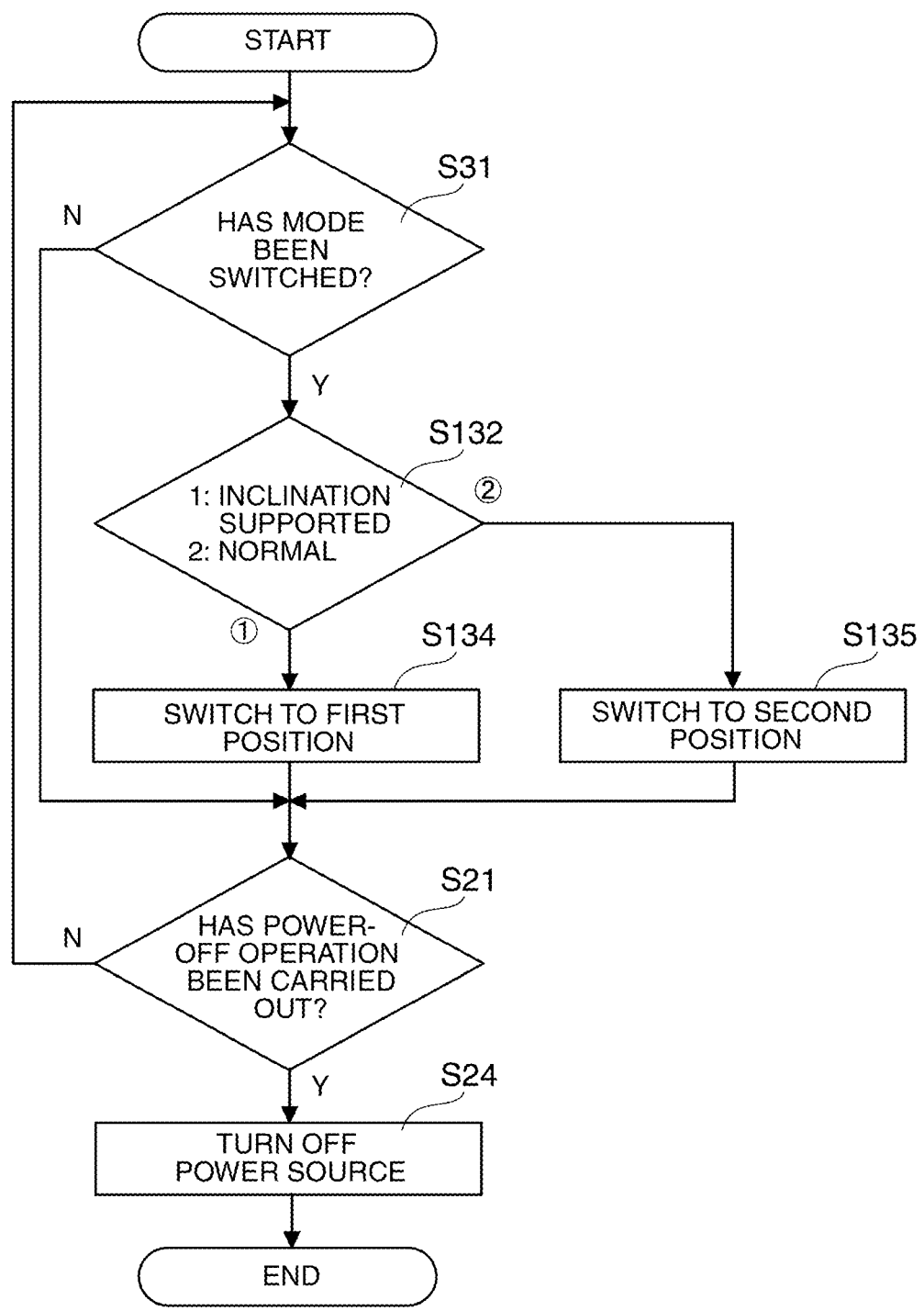
FIG. 9 is a flowchart describing an exemplary operation of the projector shown in FIG. 8.

FIG. 9 is a flowchart describing a specific example of the operation of the projector 100 according to the present embodiment.

The main control unit 99 checks in advance any operation performed on the key input unit 98 or other components and judges whether or not the user has switched the display mode (step S31). When the display mode has been switched, processes to be carried out are changed in accordance with the mode chosen in the switching operation (step S132). That is, when the user has chosen an inclination support mode that supports oblique projection, the main control unit 99 instructs the projection window drive unit 97 to operate the driver 78 so that the movable member 74 is located in the first operating position shown in FIG. 8 and performs image processing (step S134). On the other hand, when the user has chosen a normal mode that supports projection perpendicular to the front side, the main control unit 99 instructs the projection window drive unit 97 to operate the driver 78 so that the movable member 74 is located in the second operating position (not shown) and performs image processing (step S135). The main control unit 99 next checks any operation performed on the key input unit 98 or other components and judges whether or not the user has carried out the power-off operation (step S21). When the user has not carried out the power-off operation, the control returns to the first step S31 and the operations described above are repeated. When the user has carried out the power-off operation, the power-off routine is executed (step S24).

The polarization adjuster used as the optical filter of the present embodiment is not limited to the quarter-wave plate 74h, but it is conceivable to use any of other components having a variety of characteristics. By way of example, a polarization adjuster made of a material having a relatively large amount of birefringence (lithium niobate, for example) can function as an optical low-pass filter, or a polarization adjuster using birefringence cause the black matrix in the projected image to be not visible.

The quarter-wave plate 74h can be made of a birefringent inorganic material (such as quartz) or a birefringent organic material (such as polycarbonate). To prevent degradation and damage, the cover glass 74b can be used to reduce the amount of damage or degradation of the optical filter when the projector is not in use or projection using the optical filter is not necessary.

While it is assumed that the quarter-wave plate 74h converts the polarization state of each of the color light beams from linear polarization to circular polarization, the converted polarization state of each of the color light beams is not necessarily fully circular polarization but elliptical polarization as long as discrepancy in the polarization state is sufficiently small among the color light beams.

Third Embodiment

A projector of a third embodiment will be described below with reference to FIG. 10 and other figures. A projector 100 of the present embodiment is a variation of the projector 100 of the first embodiment. The portions that will not be particularly described are the same as those in the first embodiment.

Figure 10:
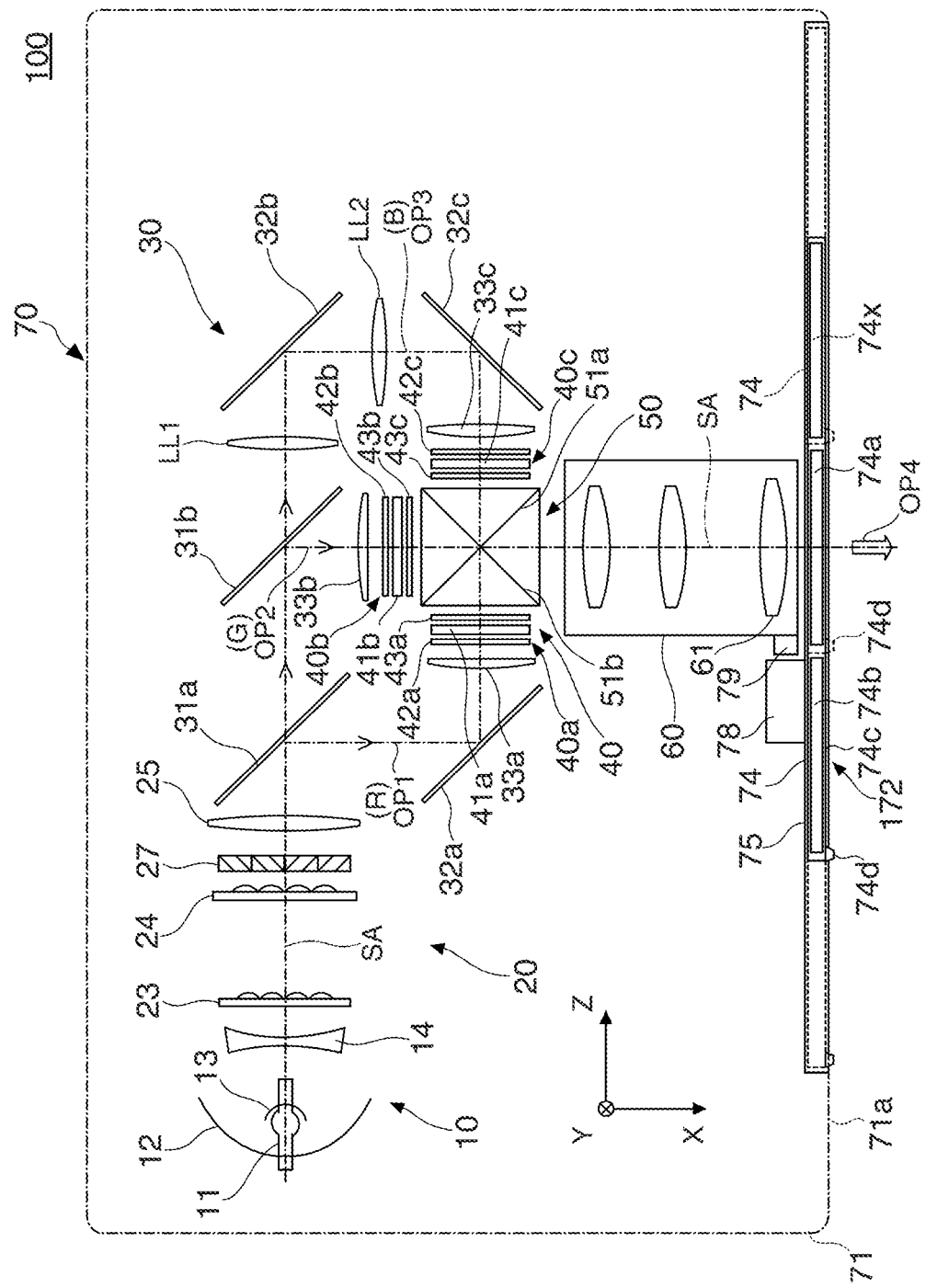
FIG. 10 is a plan view describing a projector according to a third embodiment.

As shown in FIG. 10, a projection window apparatus 172 provided in the projector 100 includes a protective shutter plate 74x as well as the color filter 74a and the cover glass 74b. That is, the movable member 74 supports the optical filter 74a, the cover glass 74b, and the shutter plate 74x in the same plane in the frame 74c, and the projection window apparatus 172 can selectively position one of the members 74a, 74b, and 74x in the optical path OP4 on the light-exiting side of the projection lens 60. When the movable member 74 is in the first operating position and the color filter 74a is positioned in the light exiting-side optical path OP4, the projector 100 performs color correction corresponding to the amount of light attenuated by the color filter 74a and projects a color tone-priority image. When the movable member 74 is in the second operating position and the cover glass 74b is positioned in the light exiting-side optical path OP4, the projector 100 performs necessary color correction and projects a brightness-priority image. When the movable member 74 is in the third operating position and the protective shutter plate 74x is positioned in the light exiting-side optical path OP4, the movable member 74 can protect the front side of the projection lens 60 when the power is off and no image is projected. When the power is off and the shutter plate 74x is positioned in the light exiting-side optical path OP4, the color filter 74a and the cover glass 74b are housed in the projection window apparatus 172, whereby the color filter 74a and the cover glass 74b can be protected from mechanical damage when the projector 100 is moved or transported. That is, moving the movable member 74 allows the shutter plate 74x to function as a cover that protects the projection lens 60 and other components when the projector 100 is not in use.

Figure 11:
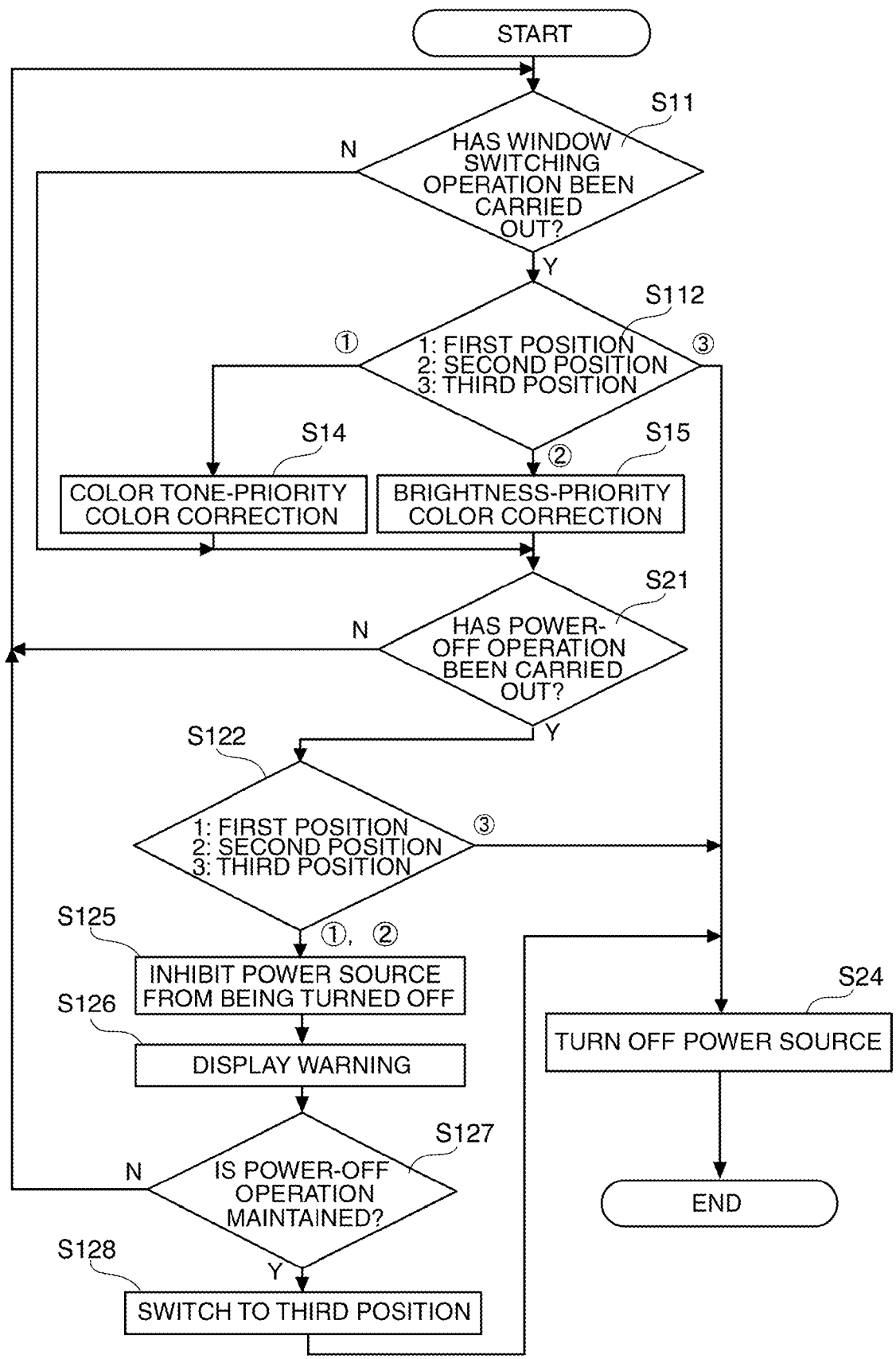
FIG. 11 is a flowchart describing an exemplary operation of the projector shown in FIG. 10.

FIG. 11 is a flowchart describing a specific example of the operation of the projector 100 of the present embodiment.

When the main control unit 99, which has initiated the projection operation, detects that the window switching operation has been carried out in the step S11, the main control unit 99 judges which of the first to third operating positions the movable member 74 is in, and changes processes to be carried out based on the judgment result (step S112).

When the main control unit 99 judges that the movable member 74 is in the first operating position and the color filter 74a covers the projection lens 60, the main control unit 99 keeps instructing the image processor 92 to perform image processing including the color tone-priority color correction and instructing the panel drive unit 93 to perform the display operations of the liquid crystal panels 41a, 41b, and 41c (step S14). When the main control unit 99 judges that the movable member 74 is in the second operating position and the cover glass 74b covers the projection lens 60, the main control unit 99 keeps instructing the image processor 92 to perform image processing including the brightness-priority color correction and instructing the panel drive unit 93 to perform the display operations of the liquid crystal panels 41a, 41b, and 41c (step S15). Further, when the main control unit 99 judges that the movable member 74 is in the third operating position and the shutter plate 74x covers the projection lens 60, the main control unit 99 advances the control to the step S24 and executes the power-off routine (step S24). That is, the display operations of the liquid crystal panels 41a, 41b, and 41c are terminated, and the light source 10 is turned off.

When the display operation is maintained, the main control unit 99 checks any operation performed on the key input unit 98 or other components and judges whether or not the user has carried out the power-off operation (step S21). When the user has not carried out the power-off operation, the control returns to the first step S11 and the operations described above are repeated. When the user has carried out the power-off operation, the control proceeds to the step S122, and the main control unit 99 judges which of the first to third positions the movable member 74 is in, and changes processes to be carried out based on the judgment result (step S122).

When the main control unit 99 judges that the movable member 74 is in the first or second operating position and the color filter 74a or the cover glass 74b covers the projection lens 60, the main control unit 99 temporality inhibits the power-off operation (step S125). That is, the main control unit 99 functions as a stop operation controller that inhibits the projection operation from being stopped. In this process, the main control unit 99 instructs the image processor 92 and the panel drive unit 93 to operate the liquid crystal panels 41a, 41b, and 41c as appropriate for warning display (step S126) Specifically, characters informing the user that the shutter plate 74x does not block the window but the color filter 74a or the cover glass 74b remains exposed are projected and displayed on the screen in such a way that the characters are superimposed on the projected image currently being displayed. The warning display can alternatively override the projected image currently being displayed.

On the other hand, when the main control unit 99 judges that the movable member 74 is in the third operating position and the shutter plate 74x covers the projection lens 60, the main control unit 99 immediately executes the power-off routine (step S24).

When the power-off operation is temporarily inhibited in the step S125, the main control unit 99 waits until a fixed period elapses and judges whether or not the user maintains the power-off operation (step S127). When the user does not maintain the power-off operation, the control returns to the first step S11 and the operations described above are repeated.

On the other hand, when the user maintains the power-off operation, the main control unit 99 instructs the projection window drive unit 97 to operate the driver 78 so that the position of the movable member 74 is forcibly switched to the third operation position (step S128). The main control unit 99 confirms whether the movable member 74 has been located in the third operating position, and then executes the power-off routine (step S24).

In the exemplary operation described above, when the movable member 74 is in the first or second operating position, it is judged in the step S127 whether or not the user maintains the power-off operation. In this case, the user's power-off operation can alternatively be always inhibited as long as the movable member 74 is in the first or second operating position. Further, when the movable member 74 is in the first or second operating position, the operations in the steps S125 to S127 can be omitted, and the position of the movable member 74 can be forcibly switched to the third operating position (step S128), followed by the execution of the power-off routine (step S24)

Figure 12:
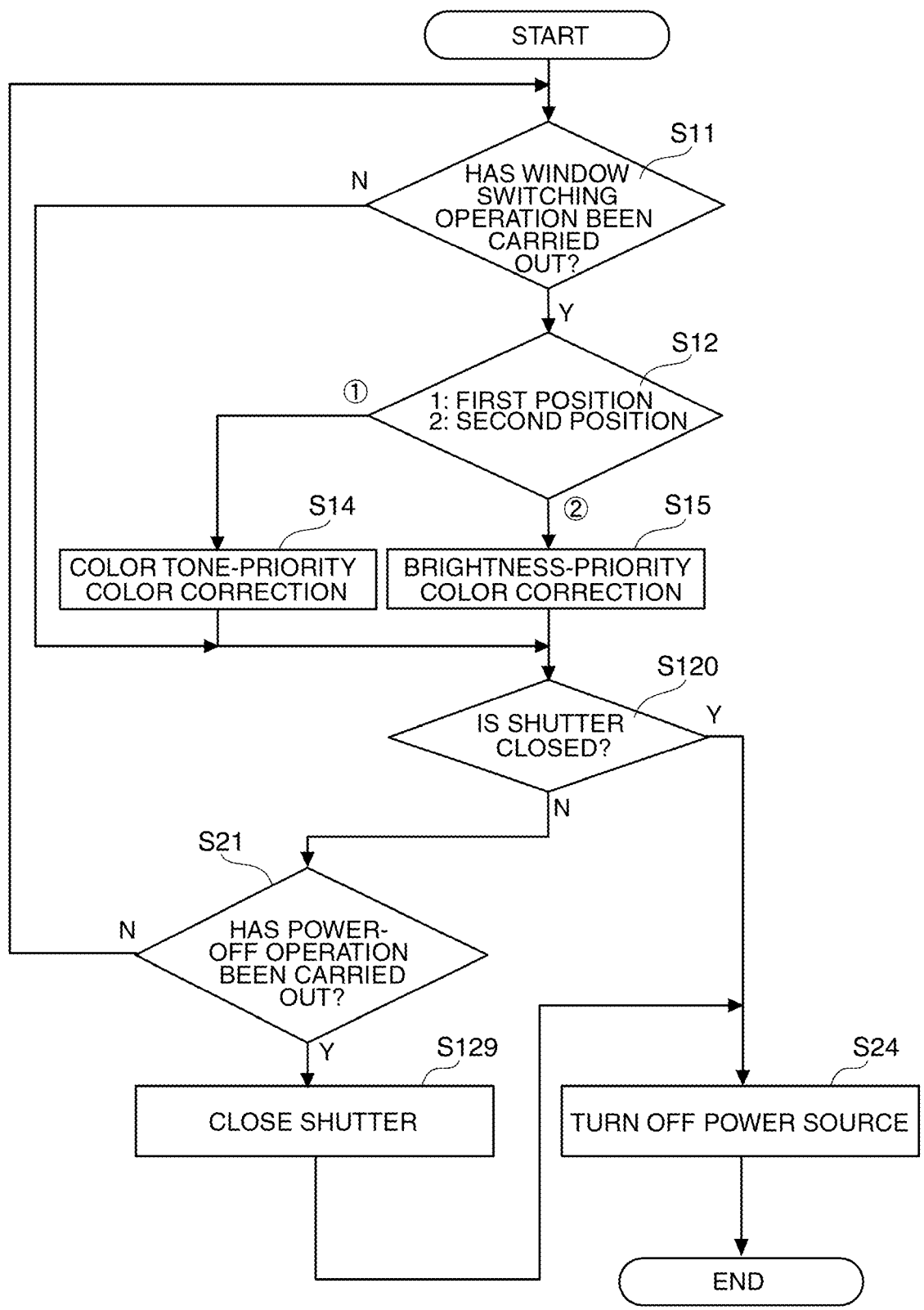
FIG. 12 is a flowchart describing another exemplary operation of the projector shown in FIG. 10.

In the present embodiment, the projection window apparatus 172 can alternatively be formed of the projection window apparatus 72 shown in FIG. 1 and a shutter apparatus provided separately from the projection window apparatus 72. In this case, the shutter plate 74x in the shutter apparatus and one of the color filter 74a and the cover glass 74b are simultaneously positioned in the optical path OP4 on the light-exiting side of the projection lens 60. Therefore, as shown in the flowchart of FIG. 12, the main control unit 99 judges on a regular basis whether or not the shutter apparatus is in a closed state (step S120). When the main control unit 99 judges that the shutter apparatus is in the closed state and the protective shutter plate 74x covers the projection lens 60, the main control unit 99 executes the power-off routine (step S24). That is, the display operations of the liquid crystal panels 41a, 41b, and 41c are terminated, and the light source 10 is turned off. When the main control unit 99 judges that the user has carried out the power-off operation in the step S21 even when the shutter apparatus is in an open state, the shutter apparatus is forcibly brought to the closed state, and the shutter plate 74x is positioned in the optical path OP4 on the light-exiting side of the projection lens 60 (step S129), followed by the execution of the power-off routine (step S24)

Fourth Embodiment

A projector of a fourth embodiment will be described below with reference to FIG. 13. A projector 100 of the present embodiment is a variation of the projector 100 of the first embodiment. The portions that will not be particularly described are the same as those in the first embodiment, and illustration and overall description will be omitted.

Figure 13:
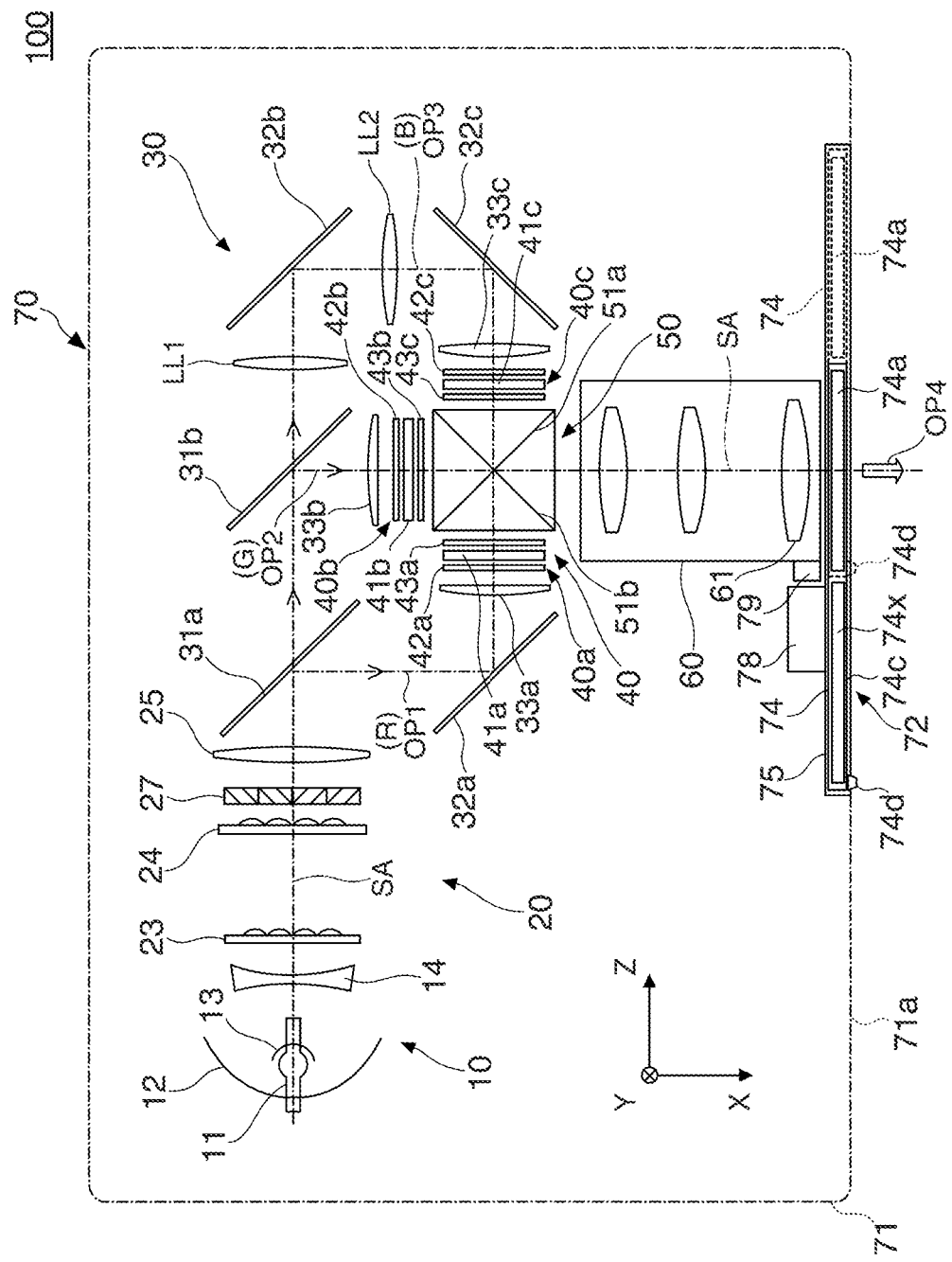
FIG. 13 is a plan view describing a projector according to a fourth embodiment.

As shown in FIG. 13, the projection window apparatus 72 provided in the projector 100 includes the color filter 74a and the protective shutter plate 74x. That is, the movable member 74 supports the color filter 74a and the shutter plate 74x in the same plane in the frame 74c, and the projection window apparatus 72 can alternately position one of the color filter 74a and the shutter plate 74x in the optical path OP4 on the light-exiting side of the projection lens 60. When the movable member 74 is in the first operating position and the color filter 74a is positioned in the light exiting-side optical path OP4, the projector 100 performs color correction corresponding to the amount of light attenuated by the color filter 74a and projects a color tone-priority image. When the movable member 74 is in the second operating position and the protective shutter plate 74x is positioned in the light exiting-side optical path OP4, the movable member 74 can protect the front side of the projection lens 60 when the power is off and no image is projected. When the power is off and the shutter plate 74x is positioned in the light exiting-side optical path OP4, the color filter 74a is housed in the projection window apparatus 72, whereby the color filter 74a can be protected from mechanical damage when the projector 100 is moved or transported. That is, moving the movable member 74 allows the shutter plate 74x to function as a cover that protects the projection lens 60, the color filter 74a, and other components.

Figure 14:
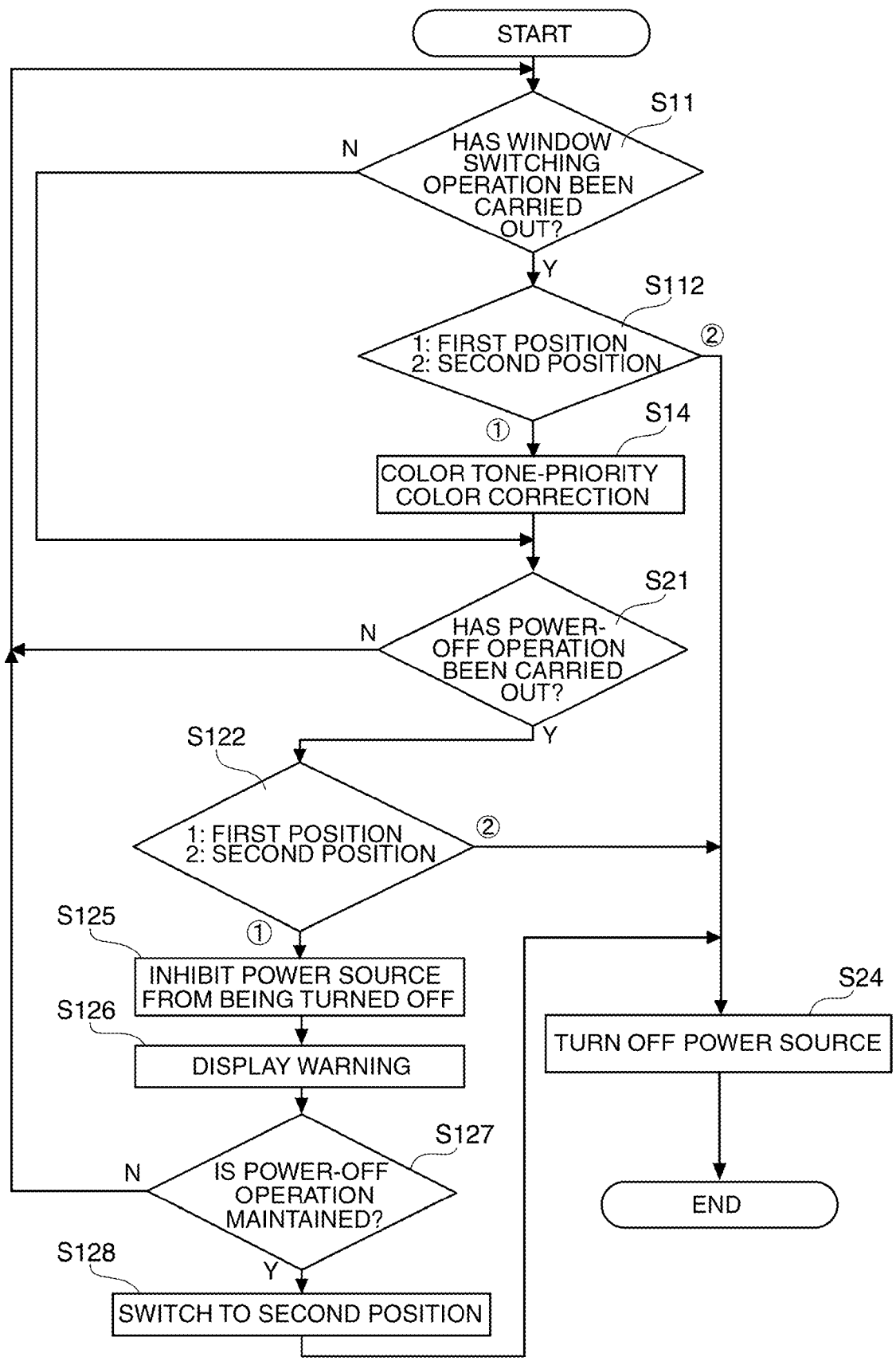
FIG. 14 is a flowchart describing an exemplary operation of the projector shown in FIG. 13.

FIG. 14 is a flowchart describing a specific example of the operation of the projector 100 of the present embodiment. When the main control unit 99 detects that the window switching operation has been carried out in the step S11, the main control unit 99 judges which of the first and second operating positions the movable member 74 is in, and changes processes to be carried out based on the judgment result (step S112).

When the main control unit 99 judges that the movable member 74 is in the first operating position and the color filter 74a covers the projection lens 60, the main control unit 99 keeps instructing the image processor 92 to perform color tone-priority image processing (step S14). When the main control unit 99 judges that the movable member 74 is in the second operating position and the shutter plate 74x covers the projection lens 60, the main control unit 99 executes the power-off routine (step S24). When the display operation is maintained, the main control unit 99 checks any operation performed on the key input unit 98 or other components and judges whether or not the user has carried out the power-off operation (step S21). When the user has carried out the power-off operation, the main control unit 99 judges which of the first and second positions the movable member 74 is in, and changes processes to be carried out based on the judgment result (step S122).

When the main control unit 99 judges that the movable member 74 is in the first operating position and the color filter 74a covers the projection lens 60, the main control unit 99 temporality inhibits the power-off operation (step S125). In this process, the main control unit 99 instructs the image processor 92 and the panel drive unit 93 to operate the liquid crystal panels 41a, 41b, and 41c as appropriate for warning display (step S126). On the other hand, when the main control unit 99 judges that the movable member 74 is in the second operating position and the shutter plate 74x covers the projection lens 60, the main control unit 99 immediately executes the power-off routine (step S24).

When the power-off operation is temporarily inhibited in the step S125, the main control unit 99 waits until a fixed period elapses and judges whether or not the user maintains the power-off operation (step S127). When the user maintains the power-off operation, the main control unit 99 instructs the projection window drive unit 97 to operate the driver 78 so that the position of the movable member 74 is forcibly switched to the second operation position (step S128), followed by the execution of the power-off routine (step S24).

Figure 8:
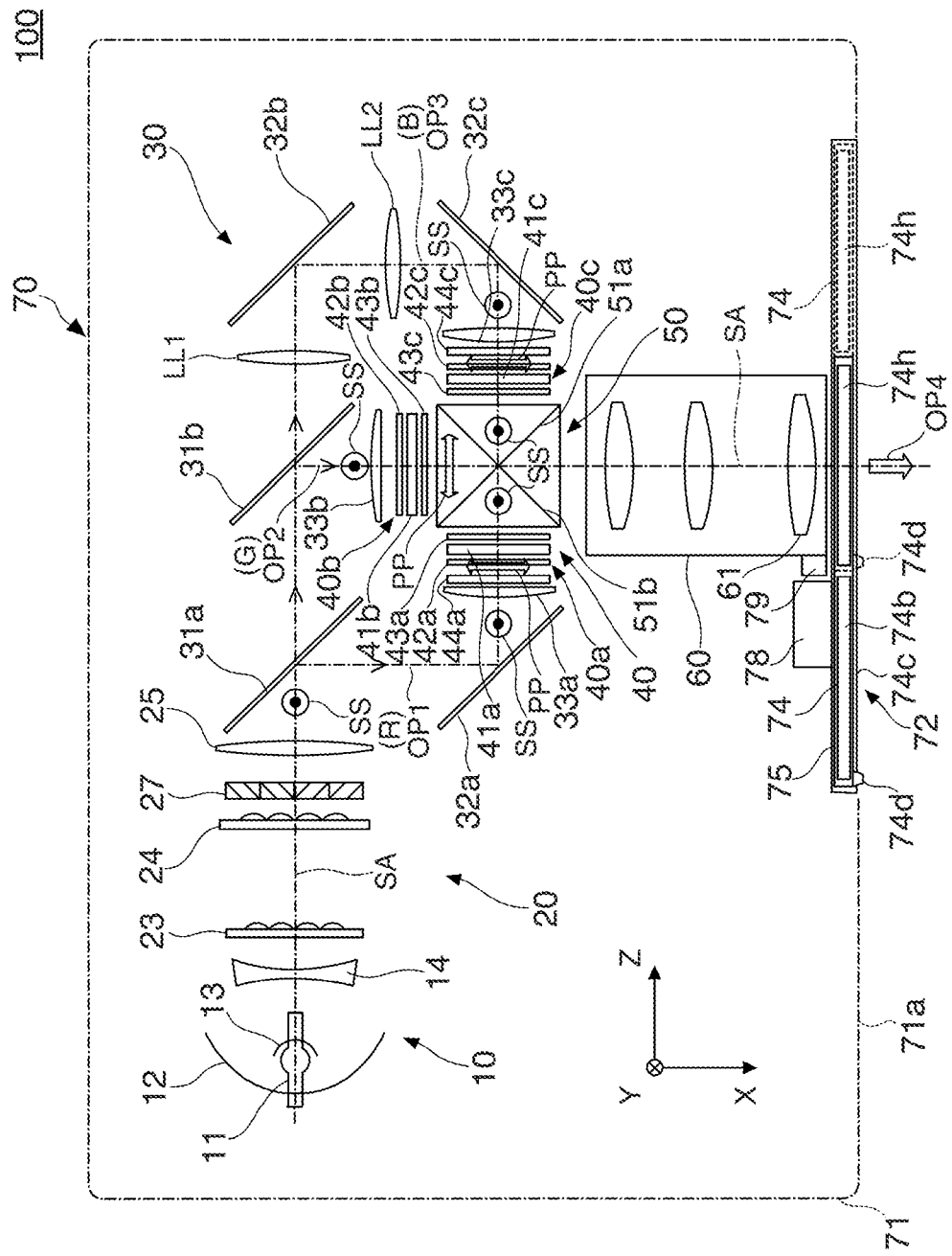
FIG. 8 is a plan view describing a projector according to a second embodiment.

In the embodiment described above, while the projection window apparatus 72 can alternately position one of the color filter 74a and the shutter plate 74x in the optical path OP4 on the light-exiting side of the projection lens 60, the color filter 74a as the optical filter can be replaced with, for example, the quarter-wave plate 74h in FIG. 8 shown in the second embodiment.

Fifth Embodiment

A projector of a fifth embodiment will be described below with reference to FIG. 15. A projector 100 of the present embodiment is a variation of the projector 100 of the third embodiment. The portions that will not be particularly described are the same as those in the third embodiment, and illustration and overall description will be omitted.

Figure 15:
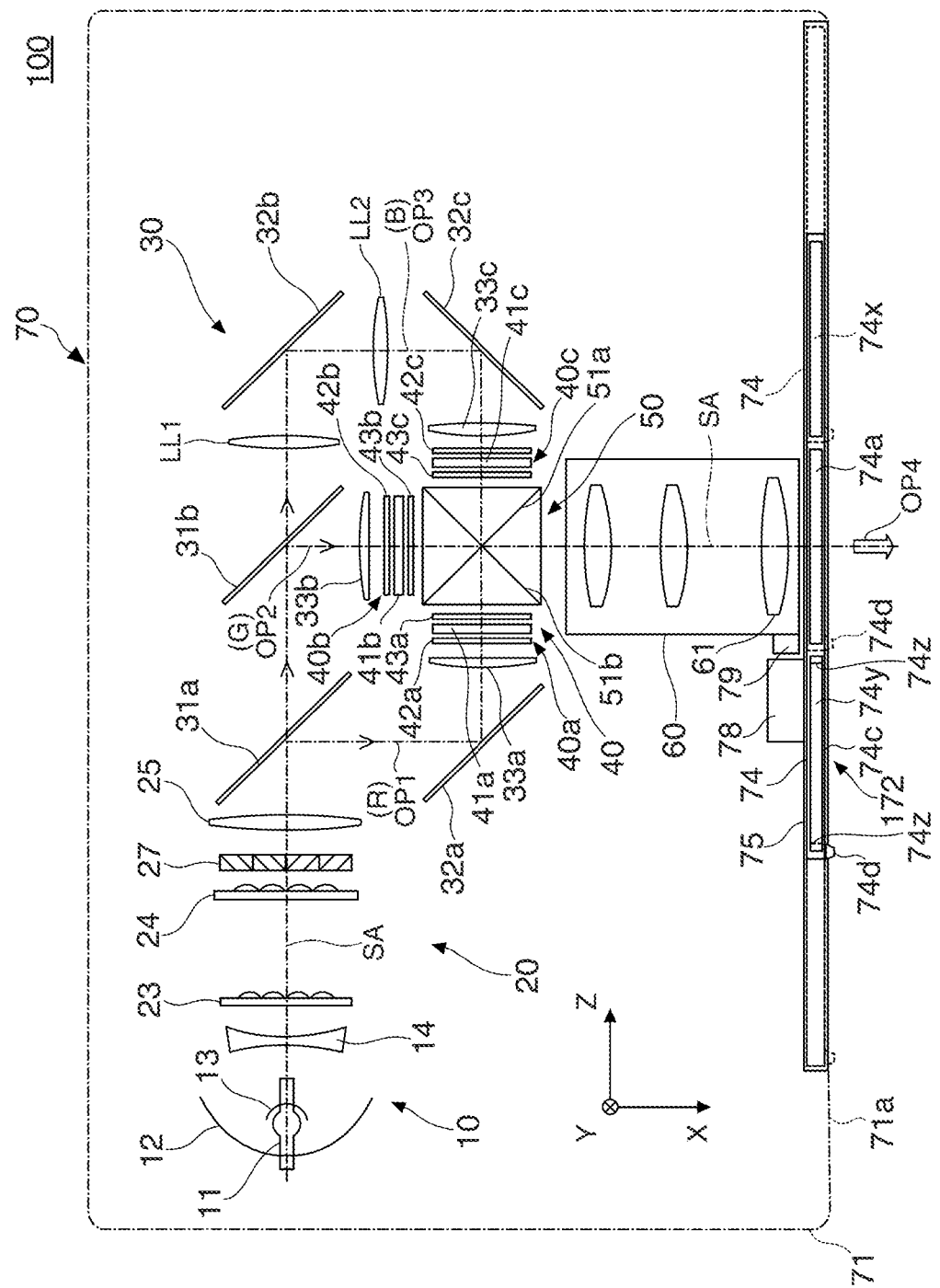
FIG. 15 is a plan view describing a projector according to a fifth embodiment.

As shown in FIG. 15, the projection window apparatus 172 provided in the projector 100 includes an opening frame 74y through which light passes straight as well as the color filter 74a and the protective shutter plate 74x. The opening frame 74y is a frame having, for example, a circular light passage opening 74z through which the projection light passes straight. That is, in FIG. 15, the cover glass 74b in FIG. 10 is replaced with the opening frame 74y. Therefore, the movable member 74 supports the color filter 74a, the shutter plate 74x, and the opening frame 74y in the same plane, and the projection window apparatus 172 can selectively position one of the color filter 74a, the shutter plate 74x, and the light passage opening 74z of the opening frame 74y in the optical path OP4 on the light-exiting side of the projection lens 60. Light can pass straight through the projection window apparatus 172 when the light passage opening 74z is positioned in the optical path, whereby the projection can be carried out with no loss at all.

The operation of the projection window apparatus 172 will be described below. When the movable member 74 is in the first operating position and the color filter 74a is positioned in the light exiting-side optical path OP4, the projector 100 performs color correction corresponding to the amount of light attenuated by the color filter 74a and projects a color tone-priority image. When the movable member 74 is in the second operating position and the light passage opening 74z of the opening frame 74y is positioned in the light exiting-side optical path OP4, the projector 100 performs necessary color correction and projects a bright image with no loss of light in the brightness priority mode. When the movable member 74 is in the third operating position and the protective shutter plate 74x is positioned in the light exiting-side optical path OP4, the movable member 74 can protect the front side of the projection lens 60 when the power is off and no image is projected. When the power is off and the shutter plate 74x is positioned in the light exiting-side optical path OP4, the color filter 74a and the opening frame 74y are housed in the projection window apparatus 172 and the shutter plate 74x covers the front side of the projection lens 60, whereby the projection lens 60 and the color filter 74a can be protected from mechanical damage when the projector 100 is moved or transported. Further, no dust or other similar objects will get through the opening frame 74y.

A specific example of the operation in the present embodiment will not be described in detail, because the description of the operation is similar to the description made in the third embodiment with reference to the flowchart shown in FIG. 11, but only differs therefrom in that the cover glass 74b in FIG. 10 is replaced with the opening frame 74y in FIG. 15. In the present embodiment as well, when the main control unit 99 judges in FIG. 15 that the movable member 74 is in the first operating position and the color filter 74a covers the projection lens 60, or that the movable member 74 is in the second operating position and the opening frame 74y is positioned downstream of the projection lens 60, the main control unit 99 can temporality inhibit the power-off operation, as in the case of the third embodiment. That is, in this case, the main control unit 99 functions as a stop operation controller that inhibits the projection operation from being stopped.

In the embodiment described above, while the projection window apparatus 172 can selectively position one of the color filter 74a, the shutter plate 74x, and the opening frame 74y in the optical path OP4 on the light-exiting side of the projection lens 60, the color filter 74a as the optical filter can be replaced with, for example, the quarter-wave plate 74h shown in the second embodiment.

Sixth Embodiment

Figure 16:
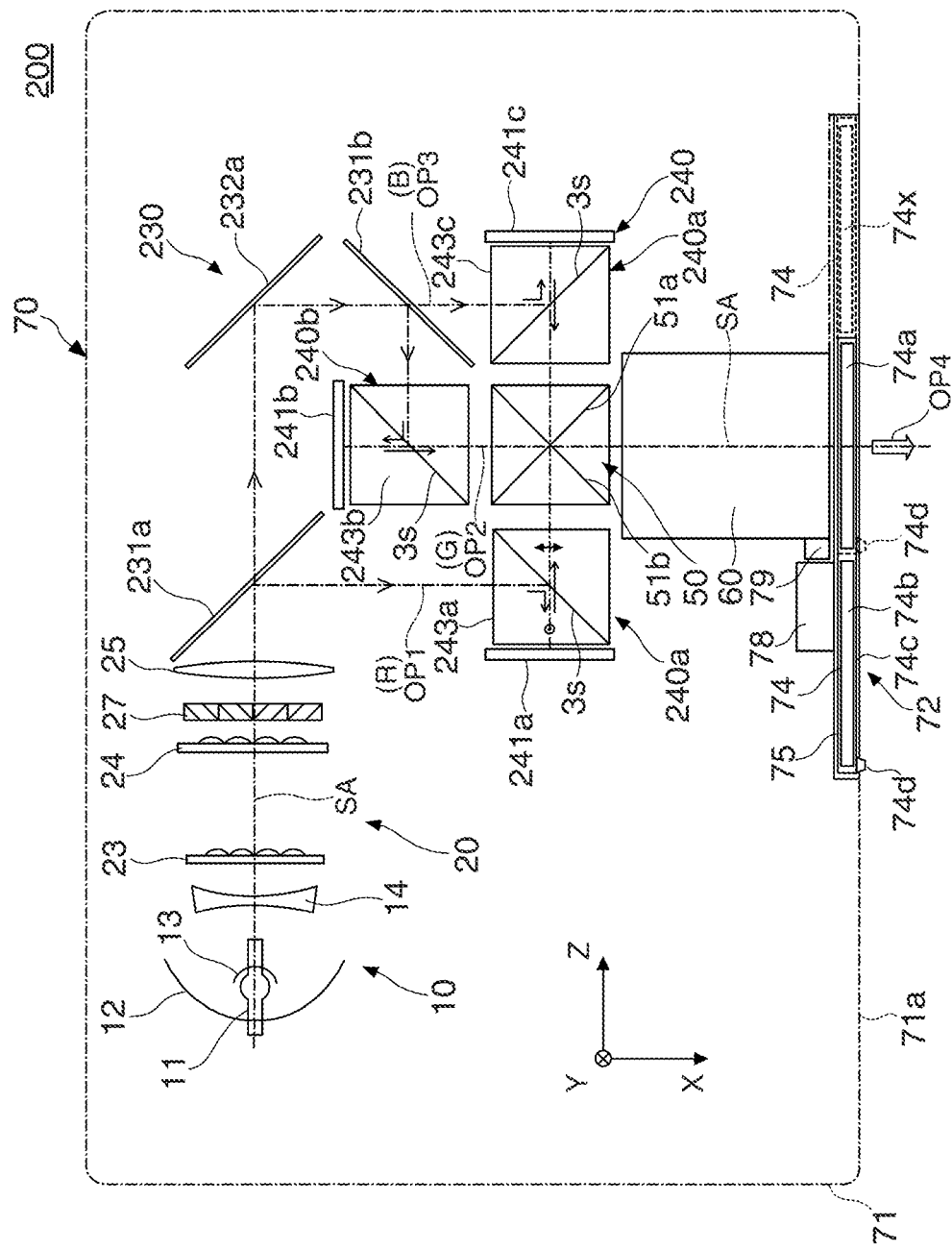
FIG. 16 is a plan view describing a projector according to a sixth embodiment.

A projector of a sixth embodiment will be described below with reference to FIG. 16. A projector 200 of the present embodiment is a variation of the projector 100 of the third embodiment. The portions that will not be particularly described are the same as those in the third embodiment, in which the first embodiment is referred as a basic structure.

The projector 200 includes the light source 10, the homogenizing system 20, a color separation system 230, a light modulation unit 240, the cross dichroic prism 50, and the projection lens 60.

The light modulation unit 240 includes liquid crystal panels 241a, 241b, and 241c and polarizing beam splitters 243a, 243b, and 243c. The liquid crystal panel 241a and the polarizing beam splitter 243a form a liquid crystal light valve 240a for R light for performing two-dimensional brightness modulation on the R light of the illumination light based on image information. Similarly, the liquid crystal panel 241b and the polarizing beam splitter 243b form a liquid crystal light valve 240b for G light, and the liquid crystal panel 241c and the polarizing beam splitter 243c form a liquid crystal light valve 240c for B light. Each of the liquid crystal panels 241a, 241b, and 241c is a light-reflective liquid crystal panel (image display device) that changes the polarization direction of the incident light on a pixel bases in accordance with an input signal.

Specifically, in the liquid crystal light valve 240a, the polarizing beam splitter 243a, which replaces the polarizing filters 42a and 43a shown in FIG. 1, adjusts the polarization direction of the light incident on the liquid crystal panel 241a and the polarization direction of the light having exited from the liquid crystal panel 241a. The polarizing beam splitter 243a has a built-in polarization separation film 3s for separating polarized light. In the polarizing beam splitter 243a, the polarization separation film 3s reflects part of the incident light, S-polarized light polarized in the direction perpendicular to the plane including the system optical axis SA (the direction perpendicular to the plane of view of FIG. 16), directs the reflected light to the liquid crystal panel 241a, and transmits part of the modulated light having exited from the liquid crystal panel 241a, P-polarized light polarized in the direction parallel to the plane including the system optical axis SA (the direction parallel to the plane of view of FIG. 16).

Each of the other liquid crystal light valves 240b and 240c has the same structure as that of the liquid crystal light valve 240a, and operates similarly to the liquid crystal light valve 240a except that the color of the illumination light to be modulated is different. Therefore, no description of the liquid crystal light valves 240b and 240c will be made.

In the color separation system 230, a first dichroic mirror 231a reflects the R light beam of the RGB three light beams and transmits the G and B light beams. A second dichroic mirror 231b reflects the G light beam of the GB two light beams and transmits the B light beam. In the color separation system 230, the R light beam reflected off the first dichroic mirror 231a is incident on the liquid crystal light valve 240a. The G light beam having passed through the first dichroic mirror 231a and having been reflected off the second dichroic mirror 231b is incident on the liquid crystal light valve 240b. The B light beam having passed through the second dichroic mirror 231b is incident on the liquid crystal light valve 240c.

In the present embodiment as well, the projection window apparatus 172 can selectively position one of the color filter 74a, the cover glass 74b, and the shutter plate 74x in the optical path OP4 on the light-exiting side of the projection lens 60. The projection window apparatus 172 can be replaced with the projection window apparatus 72 having a simple structure shown in FIG. 1 and other figures. The optical filter is also not limited to a color filter but can be any of a variety of components made of, for example, polyimide.

Seventh Embodiment

Figure 17:
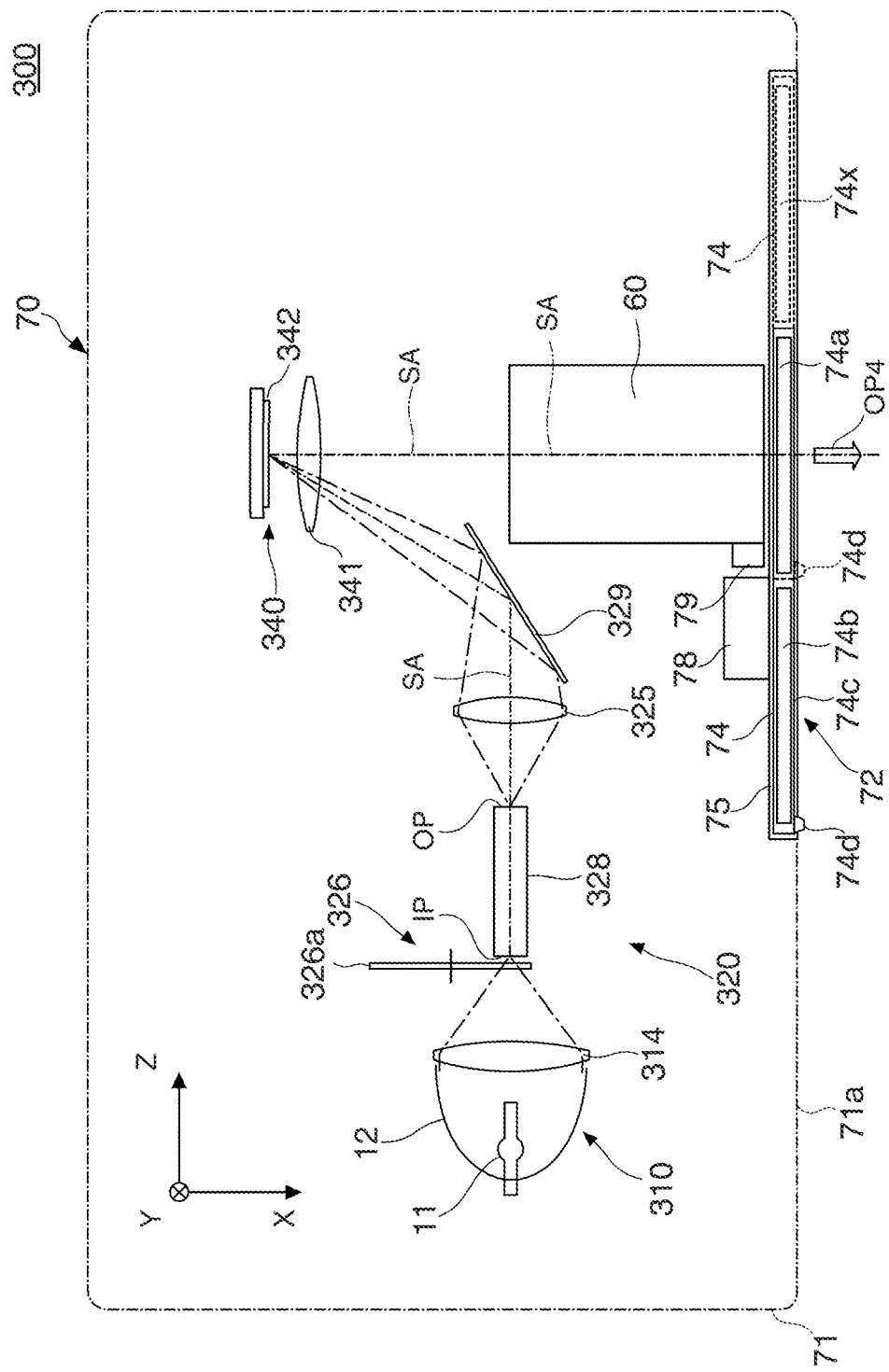
FIG. 17 is a plan view describing a projector according to a seventh embodiment.

A projector of a seventh embodiment will be described below with reference to FIG. 17. A projector 300 of the present embodiment is a variation of the projector 100 of the third embodiment. The portions that will not be particularly described are the same as those in the third embodiment, in which the first embodiment is referred as a basic structure.

The projector 300 includes a light source 310, an illumination system 320, a light modulation unit 340, and the projection lens 60. The light source 310 includes the arc tube 11 of discharge light emission type, a parabolic reflector 12, and a collector lens 314. The illumination system 320 includes a color wheel 326, a rod integrator 328, and a superimposing lens 325. The light modulation unit 340 includes a field lens 341 and a digital micromirror device 342. The digital micromirror device 342 is a reflection direction control-type light modulator.

In operation, the illumination light emitted from the light source 310 is incident on the color wheel 326. The color wheel 326 can be rotated by a motor (not shown), and RGB three color filters or four color filters including a transparent section (white) are formed in the form of a fan, respectively, on a filter surface 326a facing the light source 310. The illumination light incident on the filter surface 326a undergoes, for example, time-series color separation and resultant RGB three light beams are outputted. The illumination light having passed through the color wheel 326, which is convergent light, is incident on a light-incident surface IP of the rod integrator 328, and the incident light flux is divided when propagated through the rod integrator 328. The divided light fluxes are temporarily superimposed on one another and exit through a light-exiting surface OP. The illumination light having exited from the rod integrator 328 passes through the superimposing lens 325, is deflected off a mirror 329, and uniformly illuminates the light modulation unit 340. In the digital micromirror device 342, the micromirrors corresponding to respective pixels reflect the illumination light incident thereon for a necessary period in accordance with an image signal, and the reflected light is outputted as the image light toward the projection system. The image light having exited from the digital micromirror device 342 passes through the field lens 341, and the projection lens 60 projects the image light on a screen (not shown).

In the present embodiment as well, the projection window apparatus 172 can selectively position one of the color filter 74a, the cover glass 74b, and the shutter plate 74x in the optical path OP4 on the light-exiting side of the projection lens 60. The projection window apparatus 172 can be replaced with the projection window apparatus 72 having a simple structure shown in FIG. 1 and other figures.

The invention is not limited to the above embodiments, but can be implemented in a variety of aspects to the extent that they do not depart from the spirit of the invention. For example, the following variations are possible.

For example, each of the color filter 74a and the cover glass 74b, which is a flat plate in the above embodiment, can be a component having a curved surface, such as a spherical surface.

The movable member 74 including the color filter 74a and the cover glass 74b does not necessarily make a linear reciprocating motion along the guide members 75. The movable member 74 can alternatively be rotated by using a turret mechanism.

While the image processor 92 performs the color correction in the color-tone priority mode when the color filter 74a for attenuating G light is positioned in the light exiting-side optical path OP4 in the above embodiments, the color filter 74a can attenuate the light having any of the other colors. For example, when projection is carried out on a green board or any other colored board, the color filter 74a may perform color correction for canceling the color of the board. In this process, the image processor 92 can also perform the color correction by using grayscale control.

The power source is allowed to be turned off when the color filter 74a or the cover glass 74b is positioned in the light exiting-side optical path OP4 in the first embodiment. However, considering that protecting the color filter 74a is more desirable, the power source may not be allowed to be turned off when the color filter 74a is positioned in the light exiting-side optical path OP4. The processes to be carried out in this case are similar to those in the steps S125, S126, S127, S128, and S24 described in FIG. 11 except that the cover glass 74b instead of the shutter plate 74x is positioned in the light exiting-side optical path OP4 in the forcible power-off operation.

While the quarter-wave plate is used as the polarization adjuster in the second embodiment, a half-wave plate can alternatively be used, for example, for a 3D effect.

While the color filter 74a is used to attenuate the G light in the above embodiments, any of the other R and B light can also be attenuated depending on the light source. In this case, the single color filter 74a can be used to perform light attenuation within the wavelength ranges corresponding to two or more colors. Further, the color filter 74a can be a light attenuating filter that uniformly performs light attenuation within the visible wavelength range.

In the homogenizing system 20, each of the first and second lens arrays 23, 24 can be replaced with a rod integrator, or the first and second lens arrays 23, 24 and the superimposing lens 25 can be omitted.

It is conceivable to use a variety of lamps, such as a high-pressure mercury lamp and a metal halide lamp, as the lamp used in the light source 10 in the above embodiments. The light source 10 can be replaced with a light source without the sub-mirror 13.

The projector is either a front projector in which an image is projected from the viewer's side where the viewer observes the projection screen, or a rear projector in which an image is projected from the side opposite to the viewer's side. The configuration of the projector shown in FIG. 1 and other figures is applicable to the front and rear projectors.

Among the above embodiment, the first to sixth embodiments have been described with reference to the projector 100 using the three liquid crystal panels 41a to 41c and the projector 200 using the three liquid crystal panels 241a to 241c. The invention is also applicable to a projector using only one liquid crystal panel, a projector using two liquid crystal panels, and a projector using four or more liquid crystal panels.

The entire disclosure of Japanese Patent Application No. 2008-223134, filed Sep. 1, 2008 and Japanese Patent Application No. 2009-140900, filed Jun. 12, 2009 are expressly incorporated by reference herein.

What is claimed is:

1. A projector comprising:
a light modulation unit that modulates illumination light;
a projection unit that projects image light modulated by the light modulation unit; and a holder that holds an optical filter and a cover in such a way that the optical filter and the cover can be alternately switched and positioned in an optical path on the light-exiting side of the projection unit, wherein:
the cover includes at least a light-transmissive cover glass, and
the projector further comprises a display controller that adjusts how the light modulation unit modulates light in accordance with which of the optical filter and the cover glass is positioned in the optical path on the light exiting-side of the projection unit, such that the light modulation unit modulates light according to a first type of color correction when the optical filter is positioned in the optical path and the light modulation unit modulates light according to a second type of color correction when the cover glass is positioned in the optical path.

2. The projector according to claim 1,
wherein the optical filter is a color filter that controls the wavelength distribution of the light passing therethrough.

3. The projector according to claim 2,
wherein a dielectric multilayer film having a non-uniform transmittance-wavelength characteristic is formed on the light exiting-side surface of the color filter, and an anti-reflection film is formed on the light incident-side surface of the color filter.

4. The projector according to claim 1,
wherein the optical filter is a polarization adjuster that adjusts the polarization state of the light passing therethrough.

5. The projector according to claim 4,
wherein the polarization adjuster is a quarter-wave plate.

6. The projector according to claim 1,
wherein an anti-reflection film is formed on each of the light-exiting surface and the light-incident surface of the cover glass.

7. The projector according to claim 1,
wherein the optical filter and the cover glass have the same optical path length for the projection light, and are disposed in positions spaced apart from the projection unit by the same distance.

8. The projector according to claim 1,
wherein the cover further includes a protective shutter plate, and
the holder holds the optical filter, the cover glass, and the shutter plate in such a way that the optical filter, the cover glass, and the shutter plate can be selectively switched and positioned in the optical path on the light exiting-side of the projection unit.

9. The projector according to claim 1,
wherein the optical filter is a color filter.

10. The projector according to claim 1,
wherein the holder further includes a light passage opening through which the projection light passes straight, and
the holder holds the optical filter, the cover, and the light passage opening in such a way that the optical filter, the cover, and the light passage opening can be selectively switched and positioned in the optical path on the light exiting-side of the projection unit.

11. The projector according to claim 1,
wherein the holder holds at least the optical filter and the cover arranged in a direction substantially perpendicular to the optical axis of the projection unit, and
the holder slides the optical filter and the cover in the direction substantially perpendicular to the optical axis.

12. The projector according to claim 11,
wherein the holder holds at least the optical filter in such a way that the optical filter is inclined to the optical axis of the projection unit by a predetermined inclination angle.

13. The projector according to claim 1, further comprising
a stop operation controller that inhibits the projection operation from being stopped when at least the optical filter is positioned and exposed in the optical path on the light exiting-side of the projection unit.

14. The projector according to claim 1, further comprising
a driver that drives the holder so that the optical filter and the cover are switched and positioned in the optical path.

15. A projector comprising:
a light modulation unit that modulates illumination light;
a projection unit that projects image light modulated by the light modulation unit;
a holder that holds an optical filter, a cover, and a shutter plate in such a way that the optical filter, the cover, and the shutter plate can be alternately switched and positioned in an optical path on the light-exiting side of the projection unit, and
a stop operation controller that, in response to execution of a power-off operation:
inhibits the projection operation from being stopped when the optical filter or the cover is positioned and exposed in the optical path on the light exiting-side of the projection unit, and
executes a power-off routine to stop the projection operation when the shutter plate is positioned in the optical path on the light-exiting side of the projection unit.

16. The projector according to claim 1, wherein:
the first type of color correction comprises color tone-priority color correction, and
the second type of color correction comprises brightness-priority color correction.

17. The projector according to claim 15, wherein, in response to the execution of the power-off operation, the light modulation unit modulates the illumination light such that a warning notification is projected by the projection unit when the optical filter or the cover is positioned and exposed in the optical path on the light exiting-side of the projection unit.

* * * * *